US011843542B2

(12) United States Patent
Sidebottom et al.

(10) Patent No.: US 11,843,542 B2
(45) Date of Patent: Dec. 12, 2023

(54) SAFELY ENGINEERING EGRESS TRAFFIC CHANGES

(71) Applicant: Juniper Networks, Inc., Sunnyvale, CA (US)

(72) Inventors: Gregory A. Sidebottom, Ottawa (CA); Patricio Giecco, Upland, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/079,350

(22) Filed: Oct. 23, 2020

(65) Prior Publication Data
US 2021/0234801 A1 Jul. 29, 2021

Related U.S. Application Data

(60) Provisional application No. 63/003,063, filed on Mar. 31, 2020, provisional application No. 62/965,757, filed on Jan. 24, 2020.

(51) Int. Cl.
*H04L 47/125* (2022.01)
(52) U.S. Cl.
CPC .................. *H04L 47/125* (2013.01)
(58) Field of Classification Search
None
See application file for complete search history.

(56) References Cited

U.S. PATENT DOCUMENTS

| 9,479,437 B1 | 11/2016 | Huang et al. |
| 10,355,981 B1* | 7/2019 | Matthews ........... H04L 47/6215 |
| 2010/0135155 A1 | 6/2010 | Sankhavaram |
| 2011/0075670 A1* | 3/2011 | So ........................ H04L 45/22 370/389 |

(Continued)

FOREIGN PATENT DOCUMENTS

CN 106506391 A 3/2017

OTHER PUBLICATIONS

Response to Extended Search Report dated Jun. 23, 2021, from counterpart European Application No. 21152094.5 filed Jan. 26, 2022, 8 pp.

(Continued)

*Primary Examiner* — Christine T Duong
(74) *Attorney, Agent, or Firm* — Shumaker & Sieffert, P.A.

(57) ABSTRACT

A network device can automatically select an execution plan from a set of possible execution plans that cause a first set of traffic assignments in a network to be changed to a second set of traffic assignments. A traffic assignment indicates assignments of the traffic to one or more tunnels, internal routes and/or peer links to be utilized for routing traffic received at provider edge routers through a network to prefixes. A traffic assignment can have various parameters such as bandwidth, transmission costs etc. Each execution plan has one or more steps, and each step has one or more traffic assignment changes progressing from the first set of traffic assignments to the second set of traffic assignments. The network device can automatically select an execution plan based on an evaluation metric determined for each execution plan. The evaluation metric can be a cost based metric or a quality based metric.

19 Claims, 16 Drawing Sheets

(56) References Cited

U.S. PATENT DOCUMENTS

2016/0226774 A1 8/2016 Farmanbar
2020/0389371 A1 12/2020 Tedaldi et al.

OTHER PUBLICATIONS

"Regional Internet Registries Statistics", Retrieved Mar. 12, 2021 from: https://web.archive.org/web/20200225201146/https://www-public.imtbs-tsp.eu/~maigron/RIR_Stats/index.html, Feb. 25, 2020, 3 pp.

Awduche et al., "Overview and Principles of Internet Traffic Engineering," The Internet Society, Network Working Group, RFC 3272, May 2002, 71 pp.

Wang et al., "An Overview of Routing Optimization for Internet Traffic Engineering", IEEE Communications Surveys & Tutorials, vol. 10, No. 1, Apr. 3, 2008, pp. 33-56.

Rekhter et al., "A Border Gateway Protocol 4 (BGP-4)," Network Working Group, RFC 1771, Mar. 1995, 57 pp.

Kadiyala et al., "Inter-AS Traffic Engineering with SDN", IEEE, in Proceedings of 2017 IEEE Conference on Network Function Virtualization and Software Defined Networks (NFV-SDN), Nov. 6-8, 2017, 7 pp.

Akyildiz et al., "Research Challenges for Traffic Engineering in Software Defined Networks", IEEE Network, vol. 30, No. 3, May/Jun. 2016, pp. 52-58.

Filsfils et al., "The Segment Routing Architecture," IEEE, in Proceedings of 2015 IEEE Global Communications Conference (GLOBECOM), Dec. 6-10, 2015, 6 pp.

Guo et al., "Incremental Deployment for Traffic Engineering in Hybrid SDN Network," IEEE, in Proceedings of 34th International Performance Computing and Communications Conference (IPCCC), Dec. 14-16, 2015, 8 pp.

Yan et al., "Applications of Genetic Algorithms in BGP-Based Interdomain Traffic Engineering", Int. Conf. Communications and Networking in China, Sep. 2018, pp. 109-118.

Moradi et al., "Dragon: Scalable Flexible and Efficient Traffic Engineering in Software Defined ISP Networks," IEEE Journals Selected Areas in Communication, vol. 36, No. 12, Dec. 2018, 12 pp.

Pan et al., "Fast Reroute Extensions to RSVPTE for LSP Tunnels", Network Working Group, RFC 4090, May 2005, 38 pp.

"Go," The Go Programming Language, Retrieved Mar. 23, 2021 from: https://web.archive.org/web/20200101052043/https://golang.org/, Jan. 1, 2020, 2 pp.

Extended Search Report from counterpart European Application No. 21152094.5, dated Jun. 23, 2021, 11 pp.

Beker, "Optimization Techniques for the Dimensioning and Reconfiguration of MPLS Networks," Theses: Télécom ParisTech, Retrieved from: URL:https://pastel.archives-ouvertes.fr/pastel-00000689/document, Sep. 6, 2004, 186 pp.

Katta et al., "Incremental Consistent Updates," ACM, Hot Topics in Software Defined Networking (HotSDN'13), Aug. 16, 2013, pp. 49-54.

Ohsita et al., "Gradually reconfiguring virtual network topologies based on estimated traffic matrices," IEEE /ACM Transactions on Networking; vol. 18, No. 1, Feb. 2010, pp. 177-189.

Communication pursuant to Article 94(3) EPC from counterpart European Application No. 21152094.5 dated Apr. 5, 2023, 8 pp.

First Office Action and Search Report, and translation thereof, from counterpart Chinese Application No. 202110088971.6 dated Mar. 29, 2023, 9 pp.

Response to Communication pursuant to Article 94(3) EPC dated Apr. 5, 2023, from counterpart European Application No. 21152094.5 filed Aug. 4, 2023, 10 pp.

* cited by examiner

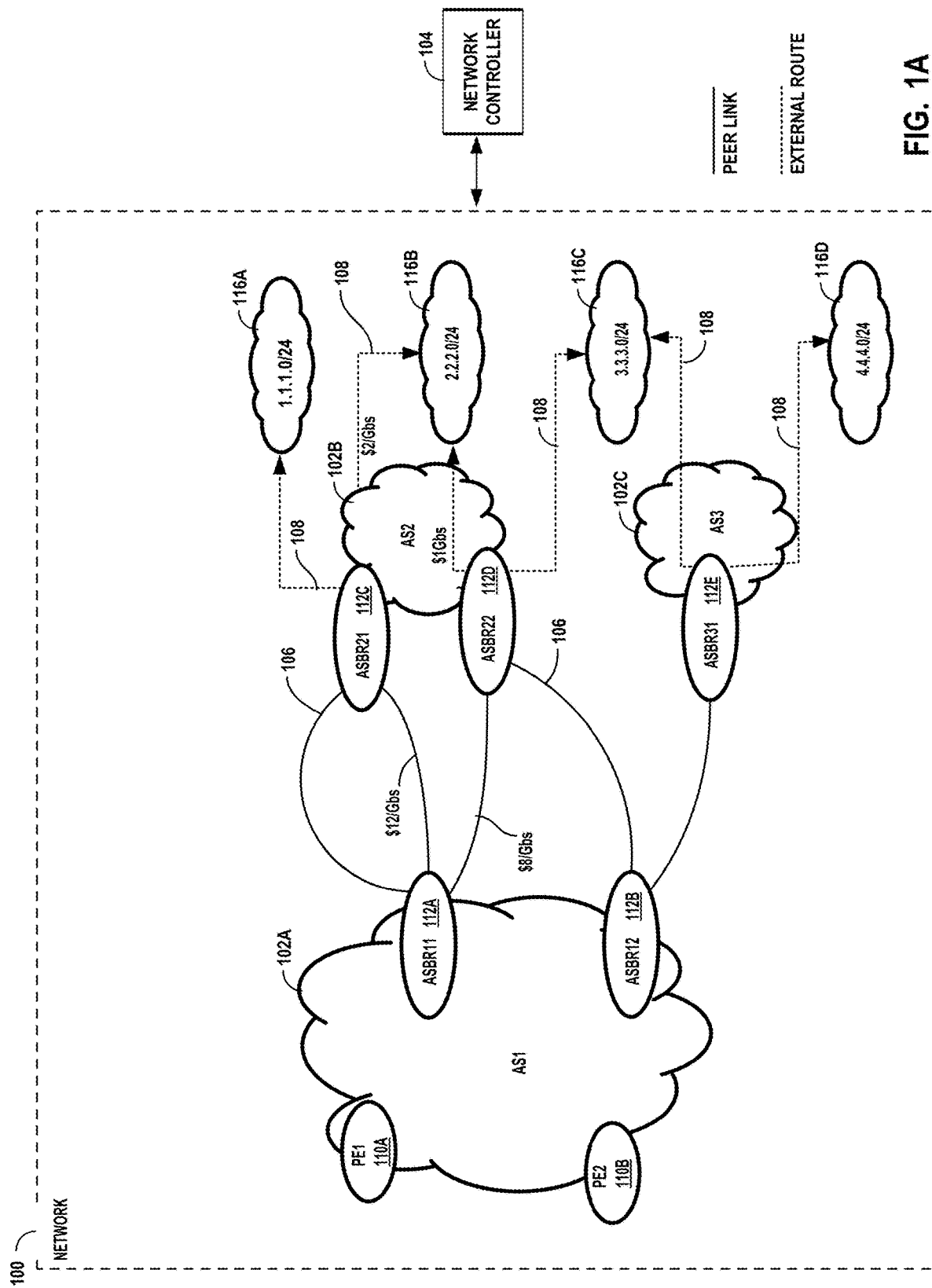

SAFELY ENGINEERING EGRESS TRAFFIC CHANGES

CROSS REFERENCE

This application claims the priority benefit of U.S. Provisional Application No. 62/965,757 entitled "SAFELY ENGINEERING EGRESS TRAFFIC CHANGES," and filed on Jan. 24, 2020 and U.S. Provisional Application No. 63/003,063 entitled "SAFELY ENGINEERING EGRESS TRAFFIC CHANGES," and filed on Mar. 31, 2020. The entire content of Application No. 62/965,757 and Application No. 63/003,063 are incorporated herein by reference.

TECHNICAL FIELD

The disclosure relates to computer networking, and more particularly, to engineering egress traffic changes on network devices in a computer network.

BACKGROUND

Internet traffic comprises flows of packets from a source to a destination. For example, when a video or audio stream is presented to an end-user, the video or audio can be delivered as a flow of packets from a server hosting the video or audio content for presentation on an end-user device. Devices connected to the Internet have an Internet Protocol (IP) address, and packets transmitted on the network include the source and destination address of the devices they travel between. Internet traffic is typically handled by a worldwide network of routers. A router handles a received packet by sending it on to a "next hop" link. The next hop is determined by the router as the best of its many links to another router that is in some sense closer to the destination of the packet. To make the decision about which next hop to use, the router uses routing tables which map sets of addresses called prefixes to the next hop to use. As an example, for an IP address, a prefix of length n is the first n of bits of the address. For instance, in Classless Interdomain Routing notation, 24 bits of the IP address 11.1.21.13 are denoted 11.1.21.0/24.

Connectivity information is exchanged among routers so the routers can build a model of the network and use shortest path algorithms to fill their routing tables with the best next hop for each prefix. Because the Internet is too large for every router to have all the detailed information about every router and prefix, the Internet is partitioned into a large set of domains called Autonomous Systems (ASs) owned by independent network operators.

Neighboring ASs in the Internet can be connected by peer links between Autonomous System Border Routers (ASBRs). An AS can use its peers to deliver traffic for destinations that are not directly reachable in the AS. Similar to routers, ASs identify a "next hop" peer link to another AS for traffic destined outside the AS. The Border Gateway Protocol (BGP) may be used among border gateway routers including ASBRs to allow routers to understand the connectivity and best paths to all prefixes in the network of interconnected ASs. Thus, routers in the Internet can establish a forwarding table that allows them to identify the best next hop for any destination.

The best path determined by the routing protocols is typically evaluated according to technical metrics that are usually related to distance, transmission delay, and number of hops. There can be many other factors that may influence how desirable a path is which are not easily incorporated into routing protocols. Owners of peering ASs often establish business agreements to route a balanced amount of each other's traffic or pay if the traffic is unbalanced. Thus, paths that incorporate expensive links may be less desirable even if they have low transmission delays. Another example is link congestion, i.e., links on short paths tend to get overloaded to the point that they cannot deliver the traffic volume assigned to them by routing protocols. As a result, network routers typically have a traffic engineering capability that may be used to assign traffic on alternatives to the shortest path selected by routing protocols.

Egress Peer Engineering (EPE) is a traffic engineering process by which a network operator directs traffic exiting its network to a peer AS in a cost-effective way. Hence, a routing optimization approach is typically used in the EPE process that attempts to optimize network resource utilization (i.e., by maximizing network efficiency and balancing traffic load distribution) as a means for maximizing profit of the network operator. At the same time, EPE can attempt to satisfy certain other network constraints with regards to a selection of QoS criteria (such as end-to-end delay, packet loss ratio, resilience, and robustness).

SUMMARY

In general, the disclosure describes techniques to enable a network device (e.g., a network controller) to automatically select an execution plan from a set of possible execution plans that, when performed, cause a first set of traffic assignments in a network to be changed to a second set of traffic assignments. A traffic assignment may indicate assignments of the traffic associated with the network to one or more tunnels, internal routes and/or peer links to be utilized for routing traffic received at provider edge routers through ASBRs and external routes to prefixes. A traffic assignment can have various parameters such as bandwidth, transmission costs etc. Each execution plan can have one or more steps, and each step can have one or more traffic assignment changes progressing from the first set of traffic assignments to the second set of traffic assignments. There can be thousands of different permutations of candidate execution plan steps (i.e., traffic assignment changes) leading from the first set of traffic assignments to the second set of traffic assignments depending on the number of available network devices. Each permutation of steps can have its own costs and quality parameters. Thus, manual selection of desirable execution plan can be both impractical given the number of permutations of candidate steps, and subject to risk of overloading network devices in the network. The network device can automatically select an execution plan from the many candidate execution plans based on an evaluation metric determined for each execution plan. The evaluation metric can be a cost based metric or a quality based metric. The steps in the selected execution plan can be ordered based on the improvement in cost or quality provided by the step. For example, steps that reduce the cost the most may be performed before steps providing lesser cost improvement. Similarly, steps that have a higher quality value may be performed before steps having a lesser quality value.

The techniques may provide technical advantages over current systems. For example, the techniques provide an automated way for a network controller to determine an execution plan that can safely achieve efficient traffic change assignment while avoiding steps that may overload a network element. The steps can be fault tolerant with respect to controller failure or connectivity issues. Further, the techniques facilitate a network controller selecting an execution plan that is progressive, i.e., an execution plan that provides the biggest improvements in traffic reassignment (e.g., the traffic assignment changes that reduce the cost most or make the most progress to the new traffic assignment) early in the step sequence of the execution plan while avoiding temporarily making network conditions worse by overloading network devices involved in the traffic assignment changes. The techniques described herein can be incorporated into a practical application such as a network controller that obtains network configuration and cost data and uses the configuration and cost data to automatically select a safe and efficient execution plan.

In one example, a method includes determining, by a computing device having one or more processors, a plurality of execution plans for changing a first traffic assignment in a network to a second traffic assignment in the network, each of the execution plans having a plurality of execution steps, wherein the first traffic assignment and the second traffic assignment comprise assignments of network traffic to one or more tunnels, internal routes or peer links of the network, and wherein the execution steps comprise one or more intermediate traffic assignment changes; determining, by the computing device, an evaluation metric for each execution plan of the plurality of execution plans; selecting, by the computing device, an execution plan from the plurality of execution plans based on the evaluation metric of the execution plan; and executing, by the computing device, the execution steps of the selected execution plan to change the first traffic assignment in the network to the second traffic assignment.

In another example, an apparatus includes one or more processors; and a computer-readable medium having instructions stored thereon to cause the one or more processors to: determine a plurality of execution plans for changing a first traffic assignment in a network to a second traffic assignment in the network, each of the execution plans having a plurality of execution steps, determine an evaluation metric for each execution plan of the plurality of execution plans, select an execution plan from the plurality of execution plans based on the evaluation metric of the execution plan, and execute the execution steps of the selected execution plan to change the first traffic assignment in the network to the second traffic assignment.

In a further example, a computer-readable medium includes instructions for causing a programmable processor to: determine a plurality of execution plans for changing a first traffic assignment in a network to a second traffic assignment in the network, each of the execution plans having a plurality of execution steps; determine an evaluation metric for each execution plan of the plurality of execution plans; select an execution plan from the plurality of execution plans based on the evaluation metric of the execution plan; and execute the execution steps of the selected execution plan to change the first traffic assignment in the network to the second traffic assignment.

The details of one or more examples are set forth in the accompanying drawings and the description below. Other features, objects, and advantages will be apparent from the description and drawings, and from the claims.

BRIEF DESCRIPTION OF DRAWINGS

FIG. 1A is a block diagram illustrating an example Egress Peer Engineering (EPE) network subject to traffic engineering, in accordance with at least one example technique described in this disclosure.

DETAILED DESCRIPTION

Figure 1B:
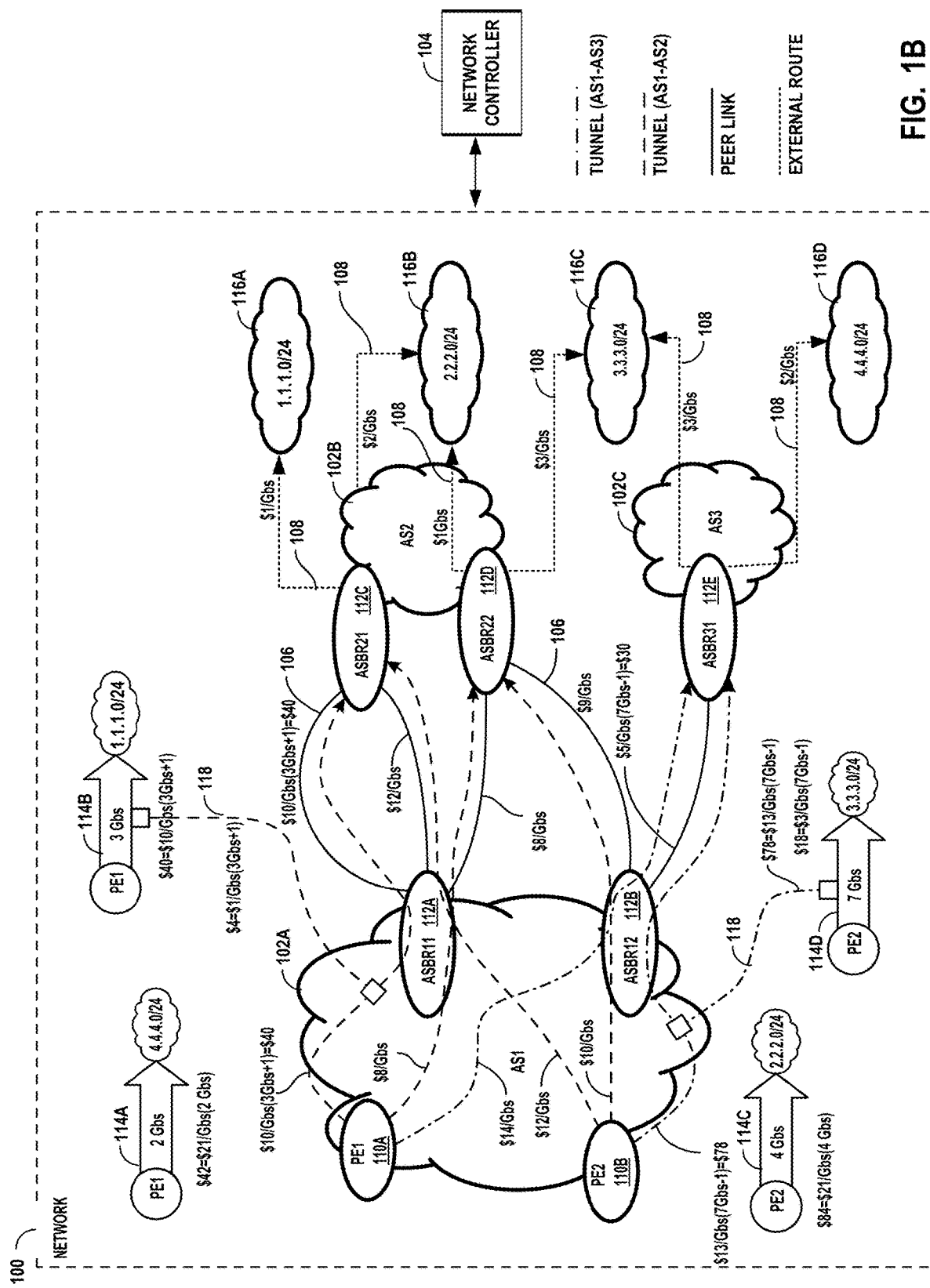
FIG. 1B is a block diagram illustrating example traffic flows and their associated costs for the example EPE network of FIG. 1A, in accordance with at least one example technique described in this disclosure.

A traffic assignment may indicate assignments of the traffic associated with the network to one or more tunnels and peer links to be utilized for the network. For example, a traffic assignment can be an assignment, by a network engineer, of network traffic to a specified path between a source node and destination node in a network. Thus, a traffic assignment may cause network traffic to flow along a different path than that specified by routing tables and routing protocols in the absence of such an assignment. In many cases, a network engineer can use network tunnels and peer links between a source and a destination and assign network traffic between the source and destination to specific tunnels or peer links. Network traffic that is not assigned to any particular path can be referred to as unassigned traffic. A traffic assignment may be based the cost of using a particular network path, available network bandwidth, and/or quality of service considerations. Network operators typically watch the traffic assignment costs as network conditions change. For example, the set of top prefixes, delay on external routes, and peering contracts can each change over time. When the total cost of the traffic assignment drifts far enough, the network operator may specify an EPE change to a more favorable traffic assignment and apply the change in the network.

It may be risky and sometimes impossible to make large scale changes in networks all at once. This can be particularly true of traffic assignment changes. For example, an unfortunate combination of traffic assignment changes may temporarily overload the network and result in lost traffic. As noted above, manual selection of an execution plan can be impractical given the large number of different combinations of traffic assignment changes that are possible in networks having large numbers of network devices. Further, manual selection of execution plans can result in overloading network devices, thereby degrading network operations. A technical advantage of the techniques disclosed herein over existing systems is a network controller that can automatically determine an execution plan with steps that avoid overloading network devices as traffic assignments are changed. A further technical advantage is a network controller that can determine an execution plan where steps in the execution plan that provide greater progress in a change from one traffic assignment to a new traffic assignment are executed early in the execution plan.

As a technical solution to the above-described issues, the disclosure presents techniques that include an optimization algorithm that, in some aspects, is based on analyzing a graph representation of the traffic changes and heuristics that are likely to lead to a partition of the candidate traffic assignment changes into execution plan steps that minimize costs and/or improve the quality associated with the traffic assignment changes.

An execution plan breaks a traffic assignment change into smaller changes referred to as steps that, when performed by a network controller, provide intermediate traffic assignment changes. A network controller can execute the steps of an execution plan in some sequence results in the overall change in the traffic assignment per the EPE change specified by the network operator. Disclosed herein are techniques to automatically find desirable (i.e., safe and efficient) execution plans using evaluation metrics that can be determined as described herein. The techniques described below are provided in the context of traffic assignments related to network elements such as PE routers, peer links, network tunnels, border routers, address prefixes etc. associated with an ASN. However, the techniques described below are applicable as well to traffic assignments for many other types of network elements such as network links, network nodes, network interfaces, network ports, line cards, etc.

The discussion below begins with a description of an EPE network in which traffic assignments may be changed. Aspects of a network device evaluating execution plans the achieve the change in traffic assignments will then be presented. In particular, techniques employed by a network device for evaluating execution plans where evaluation metrics are based on cost metrics are discussed. This is followed by a discussion of techniques for a network device evaluating execution plans where evaluation metrics are based on quality metrics.

FIG. 1A is a block diagram illustrating an example Egress Peer Engineering (EPE) network 100 subject to traffic engineering, in accordance with at least one example technique described in this disclosure. Example EPE network 100 includes three autonomous systems (AS) AS1 102A, AS2 102B and AS3 102C. In the example shown in FIG. 1A, traffic subject to engineering arrives in AS1 102A and is delivered by AS2 102B and AS3 102C. AS1 102A includes two Provider Edge (PE) nodes PE1 110A and PE2 110B where traffic enters AS1 102A. AS1 102A further includes two Autonomous System Border Routers (ASBRs) 112A and 112B where traffic leaves AS1. Example EPE network 100 includes five peer links (depicted by solid lines 106) connecting AS1 102A with AS2 102B and AS3 102C. Each peer link has an amount of bandwidth available for EPE purposes. External routes 108 (indicated by dotted lines) represent external routes starting at ASBRs in AS2 and AS3. External routes 108 can take traffic from ASBRs 112C-112D to their destination prefixes 116A-116E. External routes can be routes between an autonomous system border router (e.g., ASBRs 112) to a destination prefix (e.g., destination prefixes 116). Internal routes can be routes within an autonomous system 102.

There may be different costs associated with traffic flows through network 100 depending on the path taken through the network. For example, traffic from ASBR11 112A can take at least two paths to destination prefix 116B (2.2.2.0/24), each path having different costs. A peer link from ASBR11 112A to ASBR21 112C may have a cost of $12/Gbs and a peer link from ASBR11 112A to ASBR22 112D may have a cost of $8/Gbs. A first external route from ASBR22 112D to prefix 116B may have a cost of $1 Gbs while a second external route from AS2 may have a cost of $2/Gbs.

Network controller 104 may use the techniques described herein that can facilitate the safely changing a traffic flow to a desired traffic flow using the costs and available bandwidth for a traffic flow. Network controller 104 can manage elements of network 100, including implementing traffic flow assignments to achieve the desired traffic flow.

FIG. 1B is a block diagram illustrating example traffic flows and their associated costs for the example EPE network 100 of FIG. 1A, in accordance with at least one example technique described in this disclosure. FIG. 1B depicts four traffic flows 114A-114D, with two traffic flows entering the network at each of PE1 110A and PE2 110B. In the example, one traffic flow is destined for each prefix, each with an associated amount of bandwidth (shown under the arrow representing the respective traffic flow). In typical networks, the traffic associated with the top 1000 prefixes may represents 95% of the traffic in the network. This can result in thousands of traffic flows as traffic destined for the top prefixes normally enters at every PE.

Cost functions of bandwidth can be associated with network elements such as tunnels, peer links, internal routes, and external routes. Network controller 104 can use the cost functions to evaluate different ways of engineering the traffic. In some aspects, the cost function for a tunnel or internal route can be related to the number of links a tunnel or internal route traverses or inversely related to the delay the tunnel or internal route incurs. In some aspects, the cost function for a peer link may be defined by a contractual relationship between the AS owner and the owners of its peers. The cost function for an external route may be inversely related to the quality of service or delay incurred by using that route. Additionally, in some aspects, a further cost function can be an unassigned penalty for traffic that is not engineered and left to take the shortest path according to the routing protocols implemented in the network. The example cost functions shown in FIG. 1B are all linear. However, in some aspects, network controller 104 may utilize more general cost functions that can be calibrated to favor traffic assignments that are desirable.

In the example illustrated in FIG. 1B, the lines 118 show an assignment of two traffic flows 114B and 114D to specific tunnels. Traffic flows 114A and 114C are unassigned in the example. Using the costs of the different traffic assignments shown in the example of FIG. 1B and an unassigned traffic penalty of $21/Gbs, the traffic assignment cost is $336, determined as follows:

| | |
|---|---|
| Tunnel Costs = $40 + $78 | = $118 |
| External Route Costs = $4 + $18 | = $22 |
| Peer Link Costs = $40 + $30 | = $70 |
| Unassigned Cost = $21/$Gbs$(2+4 $Gbs$) | = $126 |
| Total Cost | = $336 |

Changing the traffic assignment of traffic flows 114A and 114C to specific tunnels can result in reduction of the unassigned costs to zero, increasing the other costs for an overall reduction of the total cost. Network controller 104 can implement techniques described herein to select a safe and efficient execution plan the accomplishes the desired traffic assignment change.

Evaluating Execution Plans Using Cost Parameters

A traffic change execution planning problem can be formulated by modelling the network and costs in subsection A. Next, traffic assignments and their costs are described in subsection B. Following, traffic changes are described in subsection C. Finally, execution plans and evaluation of execution plans using cost metrics are described, respectively, in subsection D and subsection E.

A. Network and Costs

Bandwidths and costs can be positive integers: $B=Z+$, $C=Z+$

For purposes of describing the techniques of the disclosure, let there be n PEs, m peer links (with available bandwidth), and/prefixes.

$$PE=\{1,2,\ldots,i,\ldots,n\}$$

$$PL=\{1,2,\ldots,j,\ldots,m\}, b_j \in B$$

$$PR=\{1,2,\ldots,k,\ldots,l\}$$

Tunnels TU can connect PEs to peer links PLs. In some aspects, there can be a pseudo tunnel UTU defined for each PE for unassigned traffic, and external routes ER connect peer links to prefixes. Unassigned traffic can represent traffic that is not assigned to a particular route and uses a standard routing technique such as Open Shortest Path First (OSPF) routing. The above can be modelled as:

$$TU \subseteq PE \times PL$$

$$UTU=\{(i,0)|i \in PE\}$$

$$ER \subseteq PL \times PR \qquad (1)$$

Traffic flows TR connect PEs to prefixes, with bandwidth and can be modelled as:

$$TR \subseteq PE \times PR$$

$$tr_{ik} \in B \qquad (2)$$

Cost functions for bandwidth on tunnels, peer links, external routes, and unassigned traffic bandwidth can be modelled as:

$$tu_{ij}, pl_j, er_{jk}, u \in B \to C \qquad (3)$$

B. Traffic Assignments

A traffic assignment may indicate assignments of the traffic associated with the network to one or more tunnels and peer links to be utilized for the network. A traffic assignment can map traffic to either a compatible unassigned pseudo tunnel or one of the compatible tunnels for the traffic. A pseudo tunnel is not an actual configured network tunnel, but rather is a construct used by the techniques disclosed herein to account for network flows that are not assigned to a particular path (i.e., are not part of a traffic assignment). A compatible unassigned pseudo tunnel has the same tunnel as the traffic. A compatible tunnel can be the tunnel of the traffic that connects to a peer link which is connected by an external route to the prefix of the traffic.

$$TA=\{ta_1,ta_2,\ldots,ta_s,\ldots,ta_p,\ldots\}=TR \to (TU \cup UTU) \qquad (4)$$

$$ta_s(i,k) = \begin{cases} (i, 0)(\text{unassigned}) \\ (i, j)(\exists (j, k) \in ER) \end{cases} \qquad (5)$$

Two traffic assignments ta and ta' represent a change with the first (ta) representing the state of EPE before the change, the second (ta) representing the state after the change.

The cost C(ta) of a traffic assignment can be the cost of assigning traffic bandwidth to the network elements, each of which has a cost function. The traffic assignment cost is the sum of evaluating the cost functions on the bandwidth assigned to each of these network elements. In some aspects, the following functions can be used to model the cost:

$$C_{tun}(ta) = \sum_{(i,j) \in TU} tu_{ij}\left(\sum_{((i,k),(i,j)) \in ta} tr_{ik}\right) \qquad (6)$$

$$C_{peer}(ta) = \sum_{j \in PL} pl_j\left(\sum_{((i,k),(i,j)) \in ta} tr_{ik}\right) \qquad (7)$$

$$C_{ext}(ta) = \sum_{(j,k) \in ER} er_{jk}\left(\sum_{((i,k),(i,j)) \in ta} tr_{ik}\right) \qquad (8)$$

$$C_{una}(ta) = u\left(\sum_{((i,k),(i,0)) \in ta} tr_{ik}\right) \qquad (9)$$

$$c(ta) = c_{tun}(ta) + c_{peer}(ta) + c_{ext}(ta) + c_{una}(ta) \qquad (10)$$

C. Traffic Changes

A goal of EPE can be changing from a traffic assignment ta to a lower cost and thus better traffic assignment ta'. For the purposes of the discussion below, it is assumed that given ta, a better ta' has been identified.

The difference of a traffic change (ta, ta') can be a partial assignment for the traffic that changes. Where it is defined, the difference assigns the traffic according to ta'.

$$\Delta \in TA \times TA \to (TR \hookrightarrow (TU \cup UTU))$$

$$\text{dom}(\Delta(ta,ta'))=\{(i,k)|ta(i,k) \neq ta'(i,k)\}$$

$$\Delta(ta,ta')(i,k)=ta'(i,k) \qquad (11)$$

D. Execution Plans

An execution plan can be a way to break a traffic assignment change (ta, ta') down into manageable steps, which themselves can be smaller traffic assignment changes. There can be many different ways to break a traffic assignment change into multiple steps. EP(ta, ta) can represent the set of all execution plans for plan change (ta, ta'). An execution plan can be formulated as a partition of the traffic assignments that are changing into steps which are then ordered for execution.

$$EP(ta, ta') \subset \bigcup_{P \subset 2^{dom(\Delta(ta,ta'))}} \bigcup P^{|P|}$$

$$EP(ta, ta') = \text{perms}(\text{partitions}(dom(\Delta(ta, ta'))))$$

where perms(X) is the set of all permutations of a set X, and dom(X) represents the domain of the set X.

Thus, an individual execution plan ep(ta, ta') of the set of all execution plans EP(ta, ta') can be a sequence ep(ta, ta')$_s$ of steps, where a step can be a subset of the traffic that is changing. In some aspects, the steps are a partition of the changing traffic, meaning that each changing traffic flow appears in exactly one step.

$$ep(ta,ta') \in EP(ta,ta')$$

$$ep(ta,ta') = (ep(ta,ta')_s | 1 \le s \le |ep(ta,ta')|)$$

$$ep(ta,ta')_s \cap ep(ta,ta')_t = \emptyset (1 \le s < t \le |ep(ta,ta')|)$$

$$\cup ep(ta,ta') = \text{dom}(A(ta,ta'))$$

Associated with an execution plan $ep(ta, ta')$ can be a sequence of traffic assignments $ta_0 = ta, ta_1, \ldots, ta_s, \ldots, ta_{|ep(ta,ta')|} = ta'$ after s steps are complete.

$$ta_0 = ta$$

$$ta_{1 \le s \le |ep(ta,ta')|} = ta_{S-1}$$

$$\setminus \bigcup_{(i,k) \in ep(ta,ta')_s} \{((i, k), ta_{S-1}(i, k))\}$$

$$\bigcup_{(i,k) \in ep(ta,ta')_s} \{((i, k), ta_S(i, k))\}$$

E. Evaluating Execution Plans

It can be desirable that execution plans be able to optimize various conflicting properties. Further, it can be desirable that the execution plan performs steps that make the changes that reduce the costs the most as early and quickly as possible. For example, if there are overloaded peer links resulting in lost traffic, a desirable execution plan moves traffic off those peer links as quickly as possible. However, if the network is also running near capacity, make-before-break constraints may require reserving more temporary bandwidth than is available, resulting in an execution plan that fails.

It can be also desirable for network controller 104 to do as many changes in a step as possible, minimizing the number of tunnel bandwidth changes required to temporarily reserve bandwidth for the tunnels that are gaining traffic. However, large steps can risk running into controller-network communication failures, leaving the network in an uncontrolled and/or undesirable state. For example, leaving peer links in a near capacity state which was only supposed to be temporary is an example of one such uncontrolled and/or undesirable state.

A network controller can evaluate an execution plan based on costs that can be used by the network controller to facilitate tradeoffs between potential conflicting desired properties of execution plans. In some aspects, these costs can include execution efficiency cost, network disruption cost, and temporary bandwidth costs.

The execution efficiency cost can evaluate an execution plan based on the cost of the traffic assignment after each step. In some aspects, it can assign the lowest cost to execution plans which lower the cost of the traffic assignment quickly and early in the steps. In some aspects, the efficiency cost e of an execution plan can be defined to be a front weighted sum of the costs of the traffic assignments after each step.

$$e(ep(ta, ta')) = \sum_{1 \le s \le |ep(ta,ta')|} (|ep(ta, ta')| - s + 1) c(ta_s) \quad (12)$$

A front weighted sum favors the contribution of early steps in the execution plan over later steps in the execution plan. This can be desirable because it may be beneficial to execute steps that reduce traffic assignment costs early in the execution plan.

The network disruption cost can be designed to favor plans that minimize the number of tunnel bandwidth changes required to execute the plan. For a tunnel (i, j), the bandwidth b required in a traffic assignment and the bandwidth b' required for a traffic assignment change may be defined as follows:

$$b_{ij}(ta) = \sum_{((i,k),(i,j)) \in ta} tr_{ik}$$

$$b'_{ij}(ta, ta') = b_{ij}(ta') - b_{ij}(ta)$$

In some aspects, the definitions for b and b' above can be used to define the disruption cost d of an execution plan as the total number of tunnel bandwidth changes weighted by a constant $d_w > 0$:

$$d(ep(ta, ta')) = d_w \sum_{1 \le s \le |ep(ta,ta')|} \sum_{(i,j) \in TU} |\{1 \mid b'_{ij}(ta_{s-1}, ta_s) \ne 0\}|$$

The temporary bandwidth cost can be designed to favor execution plans which limit the highest temporary bandwidth requirement over the steps of the execution plan. In some aspects, the temporary bandwidth cost can penalize execution plans that approach or exceed the bandwidth available in the network. The bandwidth available in the network can be defined as the sum of the bandwidth of the peer links. Thus, in some aspects, the bandwidth $b_a$ available for temporary reservation can be defined as:

$$b_a = \sum_{j \in PL} b_j - \sum_{(i,k) \in TR} tr_{ik}$$

In some aspects, total temporary bandwidth $b_t$ required for a traffic assignment change can be defined as:

$$b_t(ta, ta') = \sum_{(i,j) \in TU, b'_{ij}(ta,ta') > 0} b'_{ij}(ta, ta')$$

In some aspects, the worst case temporary bandwidth $b_w$ for an execution plan can be defined as:

$$b_w ep(ta, ta') = \max_{1 \le s \le |ep(ta,ta')|} b_t(ta_{s-1}, ta_s)$$

As discussed below, in some implementations, network controller 104 can utilize a linear cost function for temporary bandwidth. However, it can be undesirable to approach or exceed the available bandwidth, (even temporarily). Thus, in some implementations, a temporary bandwidth cost for an execution plan can be defined that penalizes cases where the temporary bandwidth approaches or exceeds the bandwidth available in the network. An example of such a temporary bandwidth cost can be defined as:

$$t(ep(ta,ta')) = 2^{32 b_w(ep(ta,ta'))/b_a}$$

A practical application of the techniques of the disclosure is a network controller that can determine an execution plan that may be close to minimizing the sum of the efficiency, disruption, and temporary bandwidth costs:

$$\text{cost}(ep(ta,ta'))=e(ep(ta,ta'))+d(ep(ta,ta'))+t(ep(ta,ta'))$$

A network controller can use the above definitions and models to evaluate different execution plans. However, it may not be feasible for a network controller to evaluate all permutations of all partitions of changing traffic within desired time constraints and available computing resources. Thus, in some aspects, network controller 104 can determine and analyze easily computed promising execution plans using the above described definitions and models. It may be observed that given partition of the changing traffic, the order of steps that minimizes the efficiency cost function executes the steps in order of decreasing traffic assignment cost change. In some aspects, network controller 104 can achieve such minimization by sorting the steps by $c(ta_s)-c(ta_{s-1})$.

It can be desirable for network controller 104 to determine promising partitions of execution plans and exclude other execution plans from consideration. In some aspects, a promising partition may include execution plans that do not put traffic that is moving together between tunnels in different steps. For example, splitting such changes between steps is likely to increase disruption cost. Further, assuming tunnels normally receive a relatively balanced inflow versus outflow ($b'_{ij}(ta, ta')$ is not far from zero), there may not be much to be gained by separating traffic that moves together into different steps. Network controller 104 may use this heuristic to reduce the number of partitions that are considered, thereby improving execution time and resource usage.

In some aspects, network controller 104 utilizes a traffic assignment change graph (TACG) to facilitate analysis of traffic assignment changes and costs. In some aspects, a TACG is a graph where the vertices are the changing tunnels and the edges are weighted by the bandwidth of the traffic that is moving as a group between the tunnels.

$$TACG(ta, ta') = (V, t, E, w) \text{ where:}$$

$$V \subseteq TU \cup UTU$$

$$V = \text{range}(\Delta(ta, ta')) \cup \text{range}(\Delta(ta', ta))$$

$$t \in V \times V \to 2^{TR}$$

$$t((i, j), (i, j')) = \{(i, k) \in \text{dom}(\Delta(ta, ta')) \mid ta(i, k) = (i, j), ta'(i, k) = (1, j')\}$$

$$E \subseteq V \times V$$

$$E = \text{dom}(t)$$

$$w \in E \to B$$

$$w((i, j), (i, j')) = \sum_{(i,k) \in t((i,j),(i,j'))} tr_{ik}$$

The t function can use the TACG to identify and provide traffic moving between the tunnels as a group. A GTAC function can be defined that converts a TACG back to a traffic assignment change.

$$GTAC(V,t,E)=(ta,ta') \text{ where:}$$

$$ta=\{((i,k),(i,j))\mid((i,j),(i,j'))\in E,(i,k)\in t((i,j),(i,j'))\}$$

$$ta'=\{((i,k),(i,j'))\mid((i,j),(i,j'))\in E,(i,k)\in t((i,j),(i,j'))\}$$

Partitioning a graph by its edges can be defined as follows:

$$\text{partitions}(V, E) = \{\{(V1, E1), \ldots, (Vn, En)\} \mid$$

$$\{E1, \ldots, En\} \in \text{partitions}(E),$$

$$V_r = \bigcup_{\{v,v'\} \in Er} \{v, v'\}(1 \le r \le n)$$

A network controller can perform an execution plan optimization algorithm that can be defined as follows:

In some aspects, an execution plan can be optimized. The network controller can start optimization by partitioning the TACG into connected components. Disruption and temporary costs may be the same whether changes associated with connected components are separated or not, so separating them typically does not result in worse costs.

In the next step, the network controller can search for an approximately optimal further partitioning of the changes for each connected component with respect to the disruption and temporary costs. As the changes have already been partitioned, searching all the further partitions can be feasible. A time limit can be placed on this partition search to limit the total time the algorithm takes to run and use further heuristics to select promising sub-partitions to try early in the search process.

Finally, the network controller can sort the best sequence TA of traffic assignments so the steps implied by the traffic assignments optimally minimize the efficiency cost of the plan and output the corresponding execution plan.

Other optimizations include looking for nodes in the TAC graph which are particularly unbalanced inflows versus outflows, likely that partitioning the edges on such nodes based on an efficiently recognizable pattern that may reduce the temporary bandwidth cost of the more partitioned execution plan that results. Further, subgraphs that capture the max-flow circuit in a TAC graph imply a partition where all the tunnel bandwidth exchanges perfectly balance out, resulting in partition that requires no temporary bandwidth. Thus, applying max-flow algorithms may be used to implement heuristics that identify complex and non-intuitive promising partitions.

Evaluating Execution Plans Using Quality Metrics

The discussion above has presented various aspects of techniques that determine costs associated with steps of execution plans and selects an execution plan that minimizes costs associated with the execution plan. The discussion below presents various aspects of techniques that determine quality parameters associated with execution plans and selects an execution plan that maximizes the quality parameters. The aspects discussed below maintain many of the modelling techniques and formulas described above, with differences as discussed below.

In some aspects, the paths carrying assigned traffic and unassigned traffic are referred to collectively as Internal Routes (IRs). Unassigned traffic follows the shortest path according to the Interior Gateway Protocol (IGP) from a network ingress point such as a PE to an egress peer link. In some aspects, IGP can be either OSPF or Intermediate System to Intermediate System (ISIS). Assigned traffic is engineered by steering the traffic onto a tunnel starting at a network ingress point such as a PE and ending with an egress peer link. A tunnel follows an engineered path which will generally deviate from the IGP shortest path. In such aspects, the model does not include unassigned tunnels and costs specifically attributable to unassigned traffic. Instead, the model can account for unassigned traffic using the costs of the IRs representing IGP shortest paths. Accordingly, modelling equation 1 becomes:

$$IR \subseteq PE \times PL \quad (5)$$

$$ER \subseteq PL \times PR \quad (13)$$

Cost functions for bandwidth on internal routes, peer links, external routes, and unassigned traffic bandwidth can be modelled as:

$$ir_{ij}, pl_j, er_{jk}, u \in B \rightarrow C \quad (14)$$

With the change from tunnels and unassigned tunnels to internal routes, traffic assignment may indicate assignments of the traffic TR associated with the network to one or peer links PL to be utilized for the network. Modelling equations 4 above are accordingly modified to:

$$TA = \{ta_1, ta_2, \ldots, ta_s, \ldots, ta_p \ldots\} = TR \rightarrow PL \quad (15)$$

An assignment of traffic to a peer link instead of a tunnel implicitly results in creation of an internal route. As a result, the traffic assignment modelling function for a step s of an execution plan as shown in equation 5 to:

$$ta_s(i,k) = j \ ((j,k) \in ER) \quad (16)$$

The cost of a traffic assignment can be used as part of determining a quality metric. Again, the cost functions can be simplified with the elimination of unassigned traffic costs. As an example, equation 9 above can be eliminated and the cost components and total cost function c(ta) can be simplified as shown below:

$$C_{int}(ta) = \sum_{(i,j) \in IR} ir_{ij} \left( \sum_{((i,k),j) \in ta} tr_{ik} \right) \quad (17)$$

$$C_{peer}(ta) = \sum_{j \in PL} pl_j \left( \sum_{((i,k),j) \in ta} tr_{ik} \right) \quad (18)$$

$$C_{ext}(ta) = \sum_{(j,k) \in ER} er_{jk} \left( \sum_{((i,k),j) \in ta} tr_{ik} \right) \quad (19)$$

$$c(ta) = c_{int}(ta) + c_{peer}(ta) + c_{ext}(ta) \quad (20)$$

The definition of a traffic change (ta, ta') can also change based on the change from modelling tunnels and unassigned tunnels to modelling internal routes. The change in traffic assignment change of equation 11 can become:

$$\Delta \in TA \times TA \rightarrow (TR \hookrightarrow PL)$$

$$\mathrm{dom}(\Delta(ta,ta')) = \{(i,k) | ta(i,k) \neq ta'(i,k)\}$$

$$\Delta(ta,ta')(i,k) = ta'(i,k) \quad (21)$$

Using the above, an execution plan ep(ta, ta') can be evaluated using an evaluation metric that determines a quality q of the execution plan. The evaluation metric q can a number representing the quality of an execution plan. In some aspects, q can be a number where the value one (1) represent a perfect execution plan, zero (0) represents a bad execution plan, and a negative number is a worse than bad execution plan. An execution plan that maximizes q can be selected as the highest quality execution plan. The selected execution plan can then be used to perform that traffic assignment changes.

The evaluation metric q can have constituent quality components. In some aspects, the quality components of q can be progress $\pi$, balance radius r, balance centeredness c, and ideal step size represented by $\mathrm{ideal}_{|\Delta_{tr_s}|}$.

Progress component w can be a value that can be determined based on a progress metric $\pi_s$ that represents an improvement resulting from performing step s. In some aspects, $\pi_s$ is determined based on how much a cost is reduced by the step. For example, a value of one (1) can indicate near ideal improvement (i.e., the traffic assignment cost after the step is executed is equal to the final cost). A value of zero (0) can indicate no improvement in traffic cost after the step is executed, and a negative value can indicate that the step increased the traffic assignment cost. In some implementations, $\pi_s$ can be determined according to the following equation:

$$\pi_s = 1 - \frac{c(ta_s) - c(ta')}{c(ta) - c(ta')} \quad \pi_s : 0 \rightarrow 1 \text{ as } c(ta_s) : c(ta) \rightarrow c(ta')$$

In some aspects, $q_\pi$ can be determined according to the following formula:

$$q_\pi = \mathrm{ave}_s \begin{cases} \pi_s^2 & \text{if } \pi_s \geq 0 \\ -\pi_s^2 & \text{else} \end{cases}$$

Using the above, if an execution plan overloads peer links at a step, there will typically be backward progress (i.e., $q_\pi < 0$) which will lower the quality evaluation of the execution plan enough such that there will typically be other execution plans that show better progress to serve as a selected execution plan. In some aspects, $2^{32\pi_s}$ can be used instead of $\pi_s^2$ to exaggerate q. In such aspects, computation can take place using integer division and bit shifting to lower processor overhead.

As an example, consider three execution plans $ep_1$, $ep_2$ and $ep_3$ having a progression of step costs of (5,3,1), (5,4,1) and (5,6,1) respectively. The following values of $q_\pi$ are obtained using the formula above:

$$q_\pi(5, 3, 1) \approx \left(\frac{2}{4}\right)^2 > q_\pi(5, 4, 1) \approx \left(\frac{1}{4}\right)^2 > q_\pi(5, 6, 1) \approx -\left(\frac{-1}{4}\right)^2$$

The example results demonstrate that execution plan $ep_1$ is favored over $ep_2$ because the second step of ep makes better progress (lowers cost by 2) than $ep_2$, where the second step only lowers the cost by 1. The second step of $ep_3$ increases rather than decreases cost, and thus receives the lowest rating using the disclosed equation.

A quality parameter can be based on the number of traffic assignment changes in the steps of an execution plan. In some aspects, there can be two "balance" components of a quality metric, the balance radius r and the balance centeredness c. Balance radius refers to the difference between the number of traffic assignment changes in the step having the greatest number of traffic assignment changes and the number of traffic assignment changes in the step of the execution plan having the least number of changes. In some aspects, the balance radius can be determined according to the formula below:

$$r = \frac{\max_s |\Delta_{tr,s}| - \min_s |\Delta_{tr,s}|}{2}$$

Balance center refers to the midpoint between the number of traffic assignment changes in the step having the greatest number of traffic assignment changes and the number of traffic assignment changes in the step of the execution plan having the least number of changes. In some aspects, balance center can be determined according to the formula below:

$$c = \min_s |\Delta_{tr,s}| + r$$

Figure 2:
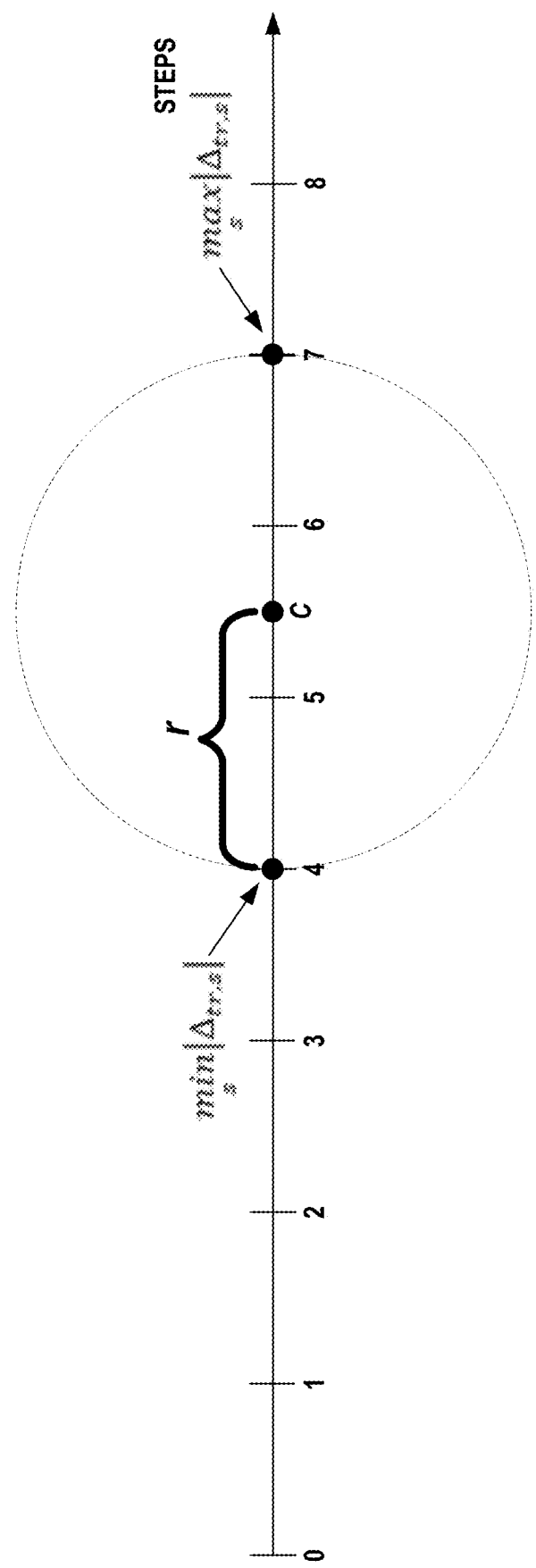
FIG. 2 is a diagram illustrating a graphical representation of balance parameters for an execution plan, in accordance with at least one example technique described in this disclosure.

FIG. 2 is a diagram illustrating a graphical representation of balance parameters for an execution plan, in accordance with at least one example technique described in this disclosure. In particular, a graphical representation of the balance radius r and balance center c is provided in FIG. 2. In the example shown in FIG. 2, an execution plan has multiple steps. A step of the execution plan having the minimum number of traffic assignment changes has four traffic assignment changes. A step of the execution plan having the maximum number of traffic assignment changes has seven traffic assignment changes. In this example, the balance radius is (7−4)/2=1.5. The balance center is 4+1.5=5.5.

In some aspects, a quality component $q_r$ based on the balance radius r can be determined according to the formula:

$$q_r = 1 - \frac{r}{r+1}$$

As an example, consider three execution plans $ep_1$, $ep_2$ and $ep_3$ having a step sequence with a number of traffic assignment changes of (7,7,7), (5,6,5,6,6) and (4,7) respectively. The following values of $q_r$ are obtained using the formula above:

$$q_r(7, 7, 7) = 1 > q_r(5, 6, 5, 6, 6) = \frac{1}{2} > q_r(4, 7) = \frac{1}{4}$$

The example results demonstrate that in some aspects, execution plans having little variance in the number of traffic assignment changes in each step can be favored over execution plans where the number of traffic assignment changes varies widely over the steps in the execution plan. Thus, in this example, $ep_1$ is favored over $ep_2$ and $ep_3$ because the number of traffic assignment changes in each step of $ep_1$ is the same (seven), resulting in zero difference between the minimum and maximum number of traffic changes in the steps of $ep_1$, while there are differences between the minimum and maximum number of traffic assignment changes in $ep_2$ and $ep_3$ (1 and 3 respectively).

In some aspects, a quality component $q_c$ based on the balance radius c can be determined according to the formula:

$$q_c = \text{ave}_s \left(1 - \frac{|c - |\Delta_{tr,s}||}{r}\right)$$

As an example, consider two execution plans $ep_1$ and $ep_2$ having a step sequence with a number of traffic assignment changes of (5,9,7,7) and (5,9,5,9,5,9) respectively. The following values of $q_c$ are obtained using the formula above:

$$q_c(5, 9, 7, 7) = \frac{2}{4} > q_c(5, 9, 5, 9, 5, 9) = \frac{0}{6}$$

This example demonstrates that execution plans can have the same r value (r=2), but the qc value can be used to favor execution plans that have execution steps where the number of traffic assignment changes in each step is close the midpoint of the minimum and maximum number of traffic changes in steps of the execution plan.

In some aspects, a quality component $q_{|\Delta_{tr,s}|}$ can be based on the difference between the number of traffic assignment changes (referred to herein as a step size) for each step in an execution plan and an ideal step size. In some aspects, q can be determined according to the formula below:

$$q_{|\Delta_{tr,s}|} = 1 - \frac{\left| \text{ideal}_{|\Delta_{tr,s}|} - \frac{\sum_s |\Delta_{tr,s}|}{|ep(ta, td')|} \right|}{\text{ideal}_{|\Delta_{tr,s}|}}$$

where $|\Delta_{tr,s}|$ is the step size, $|ep(ta, ta')|$ is the number of steps in the execution plan ep(ta, ta'), and $\text{ideal}_{|\Delta_{tr,s}|}$ is the ideal step size. The ideal step size can be a predetermined or configurable parameter. In some aspects, the ideal step size can be determined by a network administrator. In some aspects, the ideal step size can be determined programmatically. For example, machine learning algorithms or other data analysis algorithms may be applied to data describing the network and used to determine the ideal step size.

As an example, consider two execution plans $ep_1$ and $ep_2$ having step sizes of (7,5,6) and (3,3,3) respectively, where the ideal step size is seven (7) and $|ep(ta, ta')|$ is the average step size. In this example, $q_{|\Delta_{tr,s}|}(7,5,6) > q_{|\Delta_{tr,s}|}(3,3,3)$ resulting in $ep_1$ being favored over $ep_2$ because the step sizes of the steps in $ep_1$ are closer to the ideal step size than the step sizes in $ep_2$.

In some aspects, a formula for determining a quality metric q(ep(ta, ta')) can be as follows:

$$q(ep(ta,ta')) = w_\pi q_\pi + w_r q_r + w_c q_c + w_{|\Delta_{tr,s}|} q_{|\Delta_{tr,s}|}$$

where w can be a weight assigned to the corresponding quality component by a network administrator. In some aspects, the weight $w_\pi$ assigned to $q_\pi$ is set such that $q_\pi$ contributes more to q(ep(ta, ta')) than the other components $q_r$, $q_c$ and $q_{|\Delta_{tr,s}|}$. For example, $w_\pi$, $w_r$, $w_c$ and $w_{|\Delta_{tr,s}|}$ may be set such that the value of $q_\pi$ contributes 80% or more to the value of the quality metric q(ep(ta, ta')). Such a setting of $w_\pi$ can be based on a determination that the progress made in reducing costs of traffic assignment can be a more important factor then any of $q_r$, $q_c$ and $q_{|\Delta_{tr,s}|}$.

Similar to the case in cost based metric described above, in some aspects, a TACG can be used to facilitate analysis of traffic assignment changes and costs. In the case of the quality based metric, vertices V of the TACG can be peer links and the TACG is a multigraph having edges E for each traffic flow between peer links. This can be modelled as follows:

$$TACG(ta,ta') = (V,E) \text{ where:}$$

$$V \subseteq PL$$

$$V = \text{range}(\Delta(ta,ta')) \cup \text{range}(\Delta(ta',ta))$$

$$E \subseteq V \times V \times TR$$

$$E = \{(j,j',(i,k)) | (i,k) \in \text{dom}(\Delta(ta,ta')), ta(i,k) = j, ta'(i,k) = j'\}$$

FIGS. 6A-6D illustrate example TACGs and are discussed below.

Figure 3:
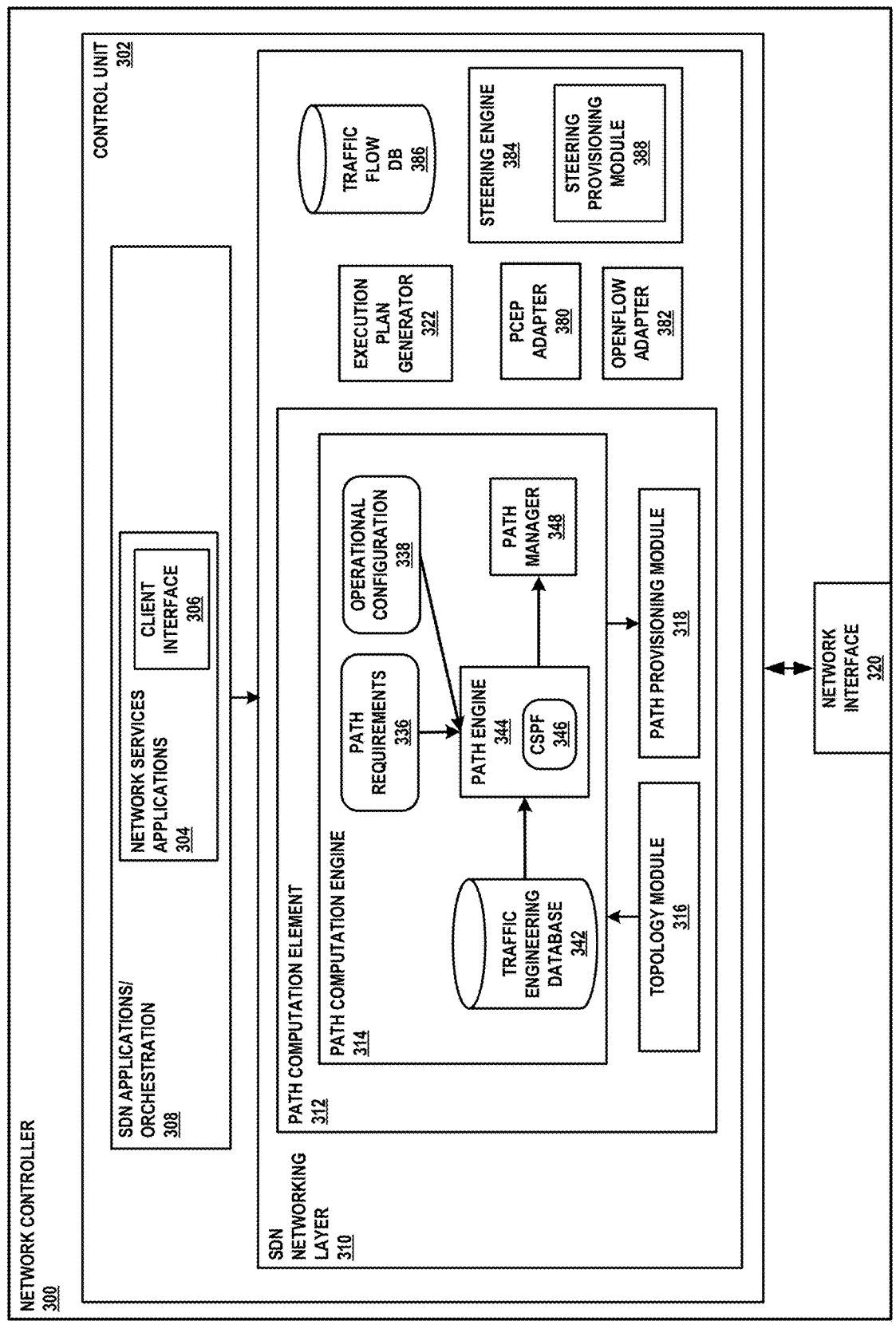
FIG. 3 is a block diagram illustrating an example network controller that determines execution plans for safely changing traffic assignments, in accordance with at least one example technique described in this disclosure.

FIG. 3 is a block diagram illustrating an example network controller that determines execution plans for safely changing traffic assignments, in accordance with at least one example technique described in this disclosure. Network controller 300 receives path requests, computes and schedules paths that satisfy the path requests, and establishes requested paths in a path computation domain. Further, network controller 300 can receive a request to change traffic assignments within a network and determine an execution plan according to techniques described herein to perform the traffic assignment change. Network controller 300 may be implemented on one or more devices running in a cloud or in a service provider premises, controlling the nodes in the network in which it is placed. Network controller 300 may represent an example instance of network controller 104 of FIG. 1.

Network controller 300 includes a control unit 302 coupled to a network interface 320 to exchange packets with other network devices by an inbound link and outbound link. Control unit 302 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 302 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 302 provides an operating environment for SDN applications and orchestration layer 308 and SDN networking layer 310. In one example, layers 308 and 310 (or the components thereof) may be implemented as one or more processes executing on one or more virtual machines of one or more servers. That is, while generally illustrated and described as executing on a single network controller 300, aspects of these components may be delegated to other computing devices.

SDN applications and orchestration layer 308 can include network services applications 304. Network services applications 304 represent one or more processes that provide services to clients of a service provider network that includes network controller 300 to manage connectivity in the aggregation domain (alternatively referred to as the "path computation domain") according to techniques of this disclosure. Network services applications 304 may provide, for instance, traffic engineering services, Voice-over-IP (VoIP) services, Video-on-Demand (VOD) services, bulk transport services, walled/open gardens, IP Mobility Subsystem (IMS) and other mobility services, firewall services, and Internet services to clients of the service provider network. In some aspects, A network administrator can utilize a network services application 304 to tell the network controller 300 at a high level what outcome is desired in the network. Network controller 300 breaks down the request into specific configuration commands and configures individual routers in the network with those commands.

Networks services applications 304 can utilize services provided by path computation element 312, such as node management, session management, and policy enforcement. Each of network services applications 304 may include client interface 306 by which one or more client applications request services. Client interface 306 may represent a command line interface (CLI) or graphical user interface (GUI), for instance. Client interface 306 may also, or alternatively, provide an application programming interface (API) such as a web service to client applications.

In some aspects, network services applications 304 may issue path requests to path computation element 312 to request paths in a path computation domain controlled by network controller 300. For example, a path request includes a required bandwidth or other constraint and two endpoints representing an access node and an edge node that communicate over the path computation domain managed by network controller 300.

In some aspects, network services applications 304 may issue traffic assignment change requests to execution plan generator 322 to request changes in traffic assignment in a path computation domain controlled by network controller 300.

SDN network layer 310 can include path computation element 312, execution plan generator 322, PCEP adapter 380 and OpenFlow adapter 382. Path computation element 312 accepts path requests from network services applications 304 to establish paths between the endpoints over the path computation domain. Paths may be requested for different times and dates and with disparate bandwidth requirements. Path computation element 312 reconciles path requests from network services applications 304 to multiplex requested paths onto the path computation domain based on requested path parameters and anticipated network resource availability.

To intelligently compute and establish paths through the path computation domain, path computation element 312 includes topology module 316 to receive topology information describing available resources of the path computation domain, including access, aggregation, and edge nodes, interfaces thereof, and interconnecting communication links.

Path computation engine 314 of path computation element 312 computes requested paths through the path computation domain. In general, paths are unidirectional. Upon computing paths, path computation engine 314 schedules the paths for provisioning by path provisioning module 318. A computed path includes path information usable by path provisioning module 318 to establish the path in the network. Provisioning a path may require path validation prior to committing the path to provide for packet transport. Path provisioning module 318 (or path computation element protocol (PCEP) adapter 380) provides information to the routers in the network to give the head-end router an indication of the path, such as by providing an Explicit Route Object (ERO). The router signals the path using Resource Reservation Protocol with Traffic Engineering extensions (RSVP-TE) to signal a Multi-Protocol Label Switching (MPLS) LSP. As another example, OpenFlow adapter 382 may provision the path using OpenFlow.

Path computation engine 314 includes data structures to store path information for computing and establishing requested paths. These data structures include path requirements 336 and operational configuration 338. Operational configuration 338 represents a data structure that provides configuration information to path computation element 312 to configure the path computation algorithm with respect to, for example, class of service (CoS) descriptors and detour behaviors. Path requirements 336 represent an interface that receives path requests for paths to be computed by path computation engine 314 and provides these path requests (including path requirements) to path engine 344 for computation. Path requirements 336 may be received, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 316 can be configured to perform topology discovery and, where needed, to maintain control channels between path computation element 312 and nodes of the path computation domain. Topology module 316 may include an interface to describe received topologies to path computation engine 314.

Topology module 316 may use a topology discovery protocol to describe the path computation domain topology to path computation engine 314. In one example, using a cloud control protocol mechanism for topology discovery, topology module 316 may receive a list of node neighbors, with each neighbor including a node identifier, local port index, and remote port index, as well as a list of link attributes each specifying a port index, bandwidth, expected time to transmit, shared link group, and fate shared group, for instance.

Topology module 316 may communicate with a topology server, such as a routing protocol route reflector, to receive topology information for a network layer of the network. Topology module 316 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology module 316 may in some instances be a passive listener that neither forwards nor originates routing protocol advertisements. In some instances, topology module 316 may alternatively, or additionally, execute a topology discovery mechanism such as an interface for an Application-Layer Traffic Optimization (ALTO) service. Topology module 316 may therefore receive a digest of topology information collected by a topology server, e.g., an ALTO server, rather than executing a routing protocol to receive routing protocol advertisements directly.

In some examples, topology module 316 receives topology information that includes traffic engineering (TE) information. Topology module 316 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology module 316 executes BGP-TE to receive advertised TE information for inter-autonomous system and other out-of-network links. Additional details regarding executing BGP to receive TE info are found in U.S. patent application Ser. No. 13/110,987, filed May 19, 2011, and entitled "DYNAMICALLY GENERATING APPLICATION-LAYER TRAFFIC OPTIMIZATION PROTOCOL MAPS," which is incorporated herein by reference in its entirety.

Traffic engineering database (TED) 342 stores topology information, received by topology module 316, for a network that constitutes a path computation domain for network controller 300 to a computer-readable storage medium (not shown). TED 342 may include one or more link-state databases (LSDBs), where link and node data is received in routing protocol advertisements, received from a topology server, and/or discovered by link-layer entities such as an overlay controller and then stored in TED 342. In some instances, a network operator may configure traffic engineering or other topology information within MT TED 342 via a client interface 306.

Path engine 344 accepts the current topology snapshot of the path computation domain in the form of TED 342 and computes, using TED 342, traffic-engineered paths between nodes and/or through dynamic networking with external modules via APIs. In general, to compute a path, path engine 344 determines based on TED 342 and all specified constraints whether there exists a path in the layer that satisfies the TE specifications for the requested path for the duration of the requested time. Path engine 344 may use the Djikstra constrained SPF (CSPF) 346 path computation algorithms for identifying satisfactory paths though the path computation domain. If there are no TE constraints, path engine 344 may revert to SPF. If a satisfactory computed path for the requested path exists, path engine 344 provides a path descriptor for the computed path to path manager 348 to establish the path using path provisioning module 318. Path manager 348 can program forwarding information for the computed path to data planes of aggregation nodes or access nodes of the path computation domain.

Execution plan generator 322 can receive new traffic assignments from a network services application 304. In some aspects, execution plan generator 322 utilizes the techniques described herein to generate an execution plan that changes a current traffic assignment to the new traffic assignment. As described above, the execution plan includes steps that progress from the current traffic assignment to the new traffic assignment. Steps in the execution plan may be provided to path computation engine 314 to update traffic engineering database 342 with the new traffic assignments and to provision paths via path provisioning module 318 that reflect the new traffic assignments.

Figure 4:
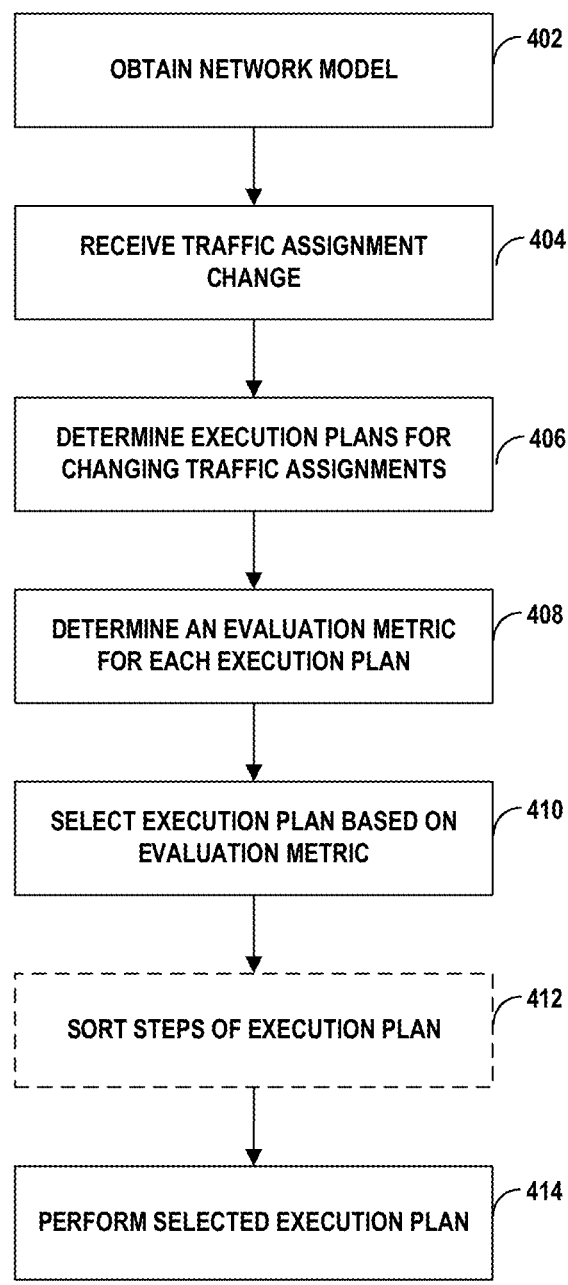
FIG. 4 is a flowchart illustrating operations of an example method for selecting an execution plan for changing traffic assignments in a network, in accordance with at least one example technique described in this disclosure.

FIG. 4 is a flowchart illustrating operations of an example method for selecting an execution plan for changing traffic assignments in a network, in accordance with at least one example technique described in this disclosure. An execution plan generator 322 of network controller 104, 300 (FIG. 1 and FIG. 3) can obtain a network model for the network, for example, from traffic engineering database 342 or from topology module 316 (402). In some aspects, the network model can include provider edge routers, peer links, internal routes of the network, external routes of the network to prefixes associated with other autonomous systems, and traffic assignment costs associated with the internal routes and external routes. The network model can also include a set of current traffic assignments for the internal routes and external routes.

Execution plan generator 322 can receive a specification of a change in traffic assignments (404). The change in traffic assignments can be provided by a network operator or automated system.

Execution plan generator 322 can determine execution plans for changing the traffic assignments (406). As discussed above, there may be many different execution plans that can perform the change in traffic assignments. Each execution plan can include steps for changing the traffic assignments from the current set of traffic assignments to a desired set of traffic assignments. Each step of the execution plan can have a set of intermediate traffic assignments.

Execution plan generator 322 can determine an evaluation metric for each execution plan (408). As discussed above, the evaluation metric may be a cost metric for the execution plan or a quality metric for the execution plan. Determining a cost metric can include determining one or more of an execution efficiency cost, a network disruption cost, and a temporary bandwidth costs as defined above. Determining a quality metric can include determining one or more of a progress value, a balance radius value, a balance center value, and an ideal step size quality value, as defined above.

Execution plan generator 322 can select an execution plan based on the evaluation metric (410). For example, in the case of a cost metric, execution plan generator 322 can select the execution plan with the lowest cost. In the case of a quality metric, execution plan generator 322 can select the execution plan having a highest value for the quality metric.

Execution plan generator 322 can optionally sort the steps of the selected execution plan in some implementations (412). For example, the steps may be sorted based on the improvement provided by the step. In the case of a cost metric, the steps can be sorted in the order of cost improvement provided by the step. Steps having greater cost improvement are performed before steps have lesser cost improvement. Similarly, in the case of quality metrics, steps having higher quality improvement can be performed before steps providing less quality improvement. In some cases, the improvement provided by a step can be dependent on where the step is placed in the order of steps in the execution plan. In some aspects, execution plan generator 322 may determine the progress value $\pi_s$ of each step after a step is placed in order based on progress. For example, an execution plan may have four steps $s_1$-$s_4$. Assume step $s_4$ has the highest progress value $\pi_s$. Step $s_4$ may be placed first in the order of execution for the execution plan. Execution plan generator 322 may reevaluate the progress value $\pi_s$ for each of steps $s_1$-$s_3$, and the step having the highest value may be placed second in the order of execution. This process can proceed until all steps in the execution plan have been ordered.

Traffic flow database 386 maintains a database of traffic flow (e.g., TR in equations 2 and 15 the mathematical model described above). In some aspects, traffic flow database 386 creates and maintains an analytic data model that may be populated from input Netflow data, Simple Network Management Protocol (SNMP) data, and/or other telemetry data form the network.

Steering engine 384 can provision steering commands on ingress points such as PEs in the network. Steering engine 384 takes traffic flows (i, k) from a PE i to prefix k and effects a traffic assignment to a peer link j by provisioning a steering command (or removing one if peer link j is on the IGP shortest path) on PE i. Steering engine 384 can include a steering provisioning module 388 that provisions steering commands in the network via protocols such as BGP and Netconf.

Network controller 104, 300 can perform the selected execution plan to change the traffic assignments in the network to the desired traffic assignments (414). For example, network controller 104, 300 can utilize steering engine 384 and steering provisioning module 388 to program network devices such as routers with configurations and policies to support the desired traffic assignments in the steps of the selected execution plan. As part of this steering process, the network controller 104, 300 may utilize the path computation engine 314 and path provisioning module 318 to provision tunnels with paths required for traffic steering according to the new plan.

Figure 5A:
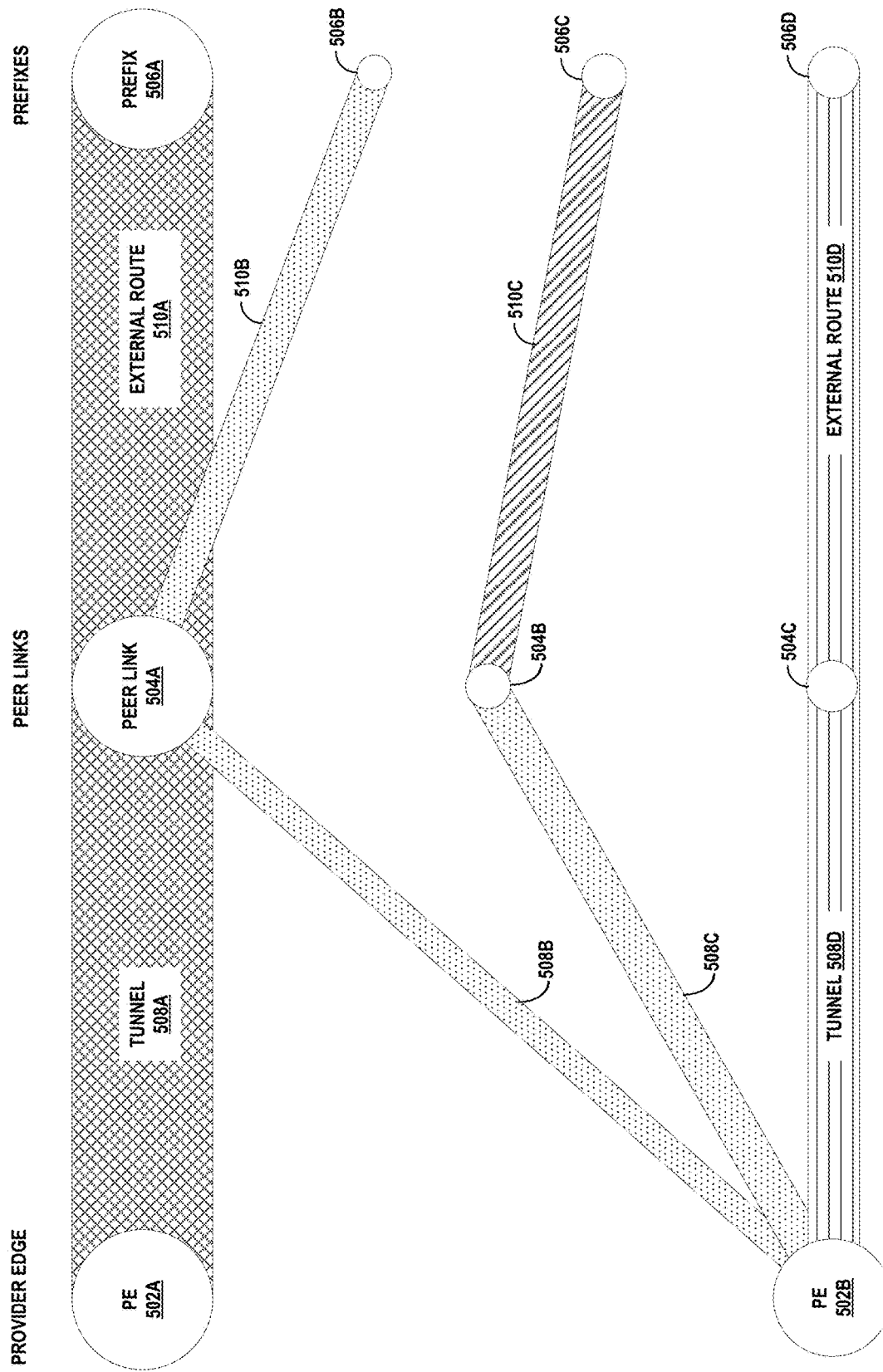
FIGS. 5A-5F show a graphical representation of traffic assignment changes in an example execution plan for an example traffic assignment, in accordance with at least one example technique described in this disclosure.
Figure 5B:
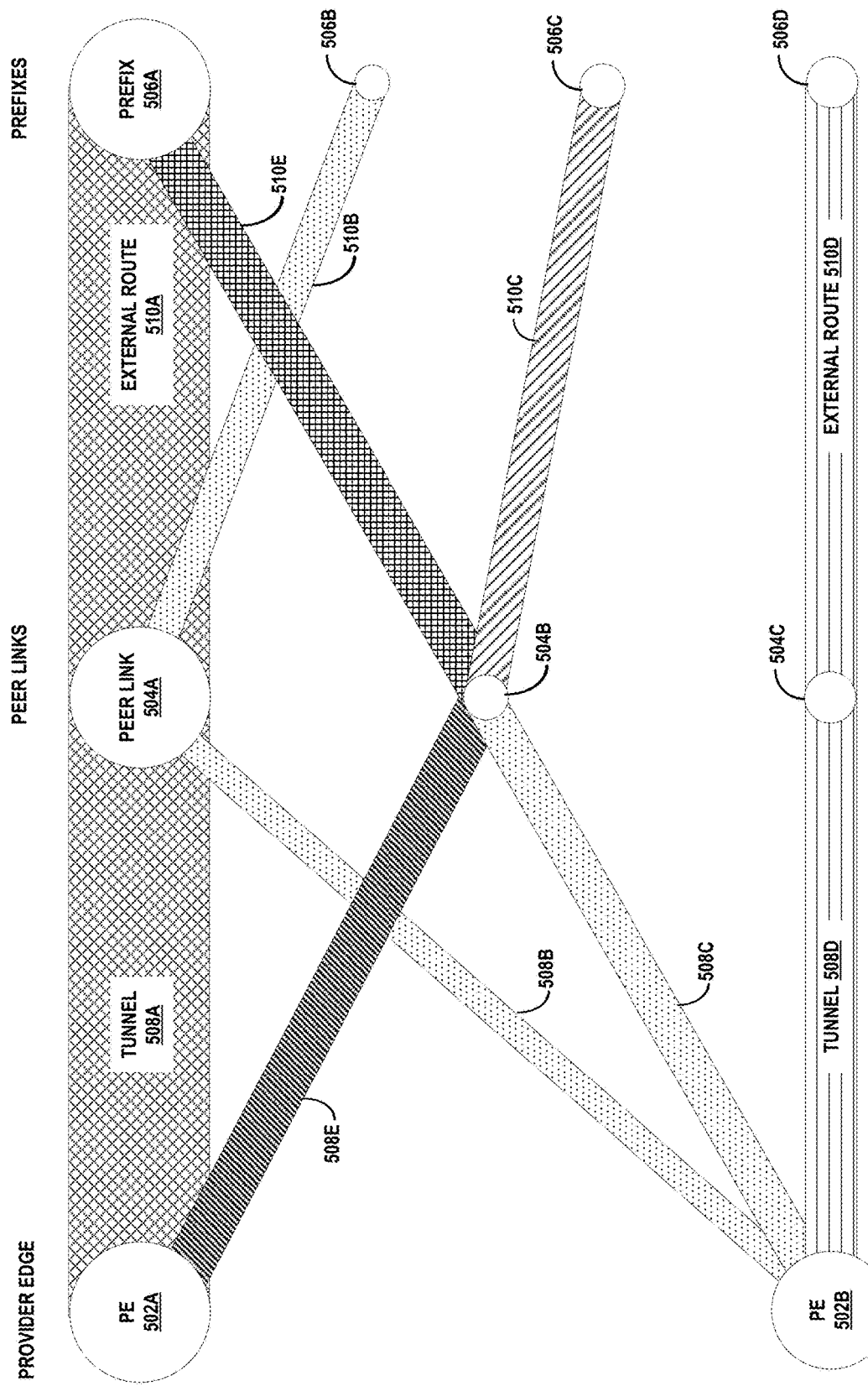
Figure 5C:
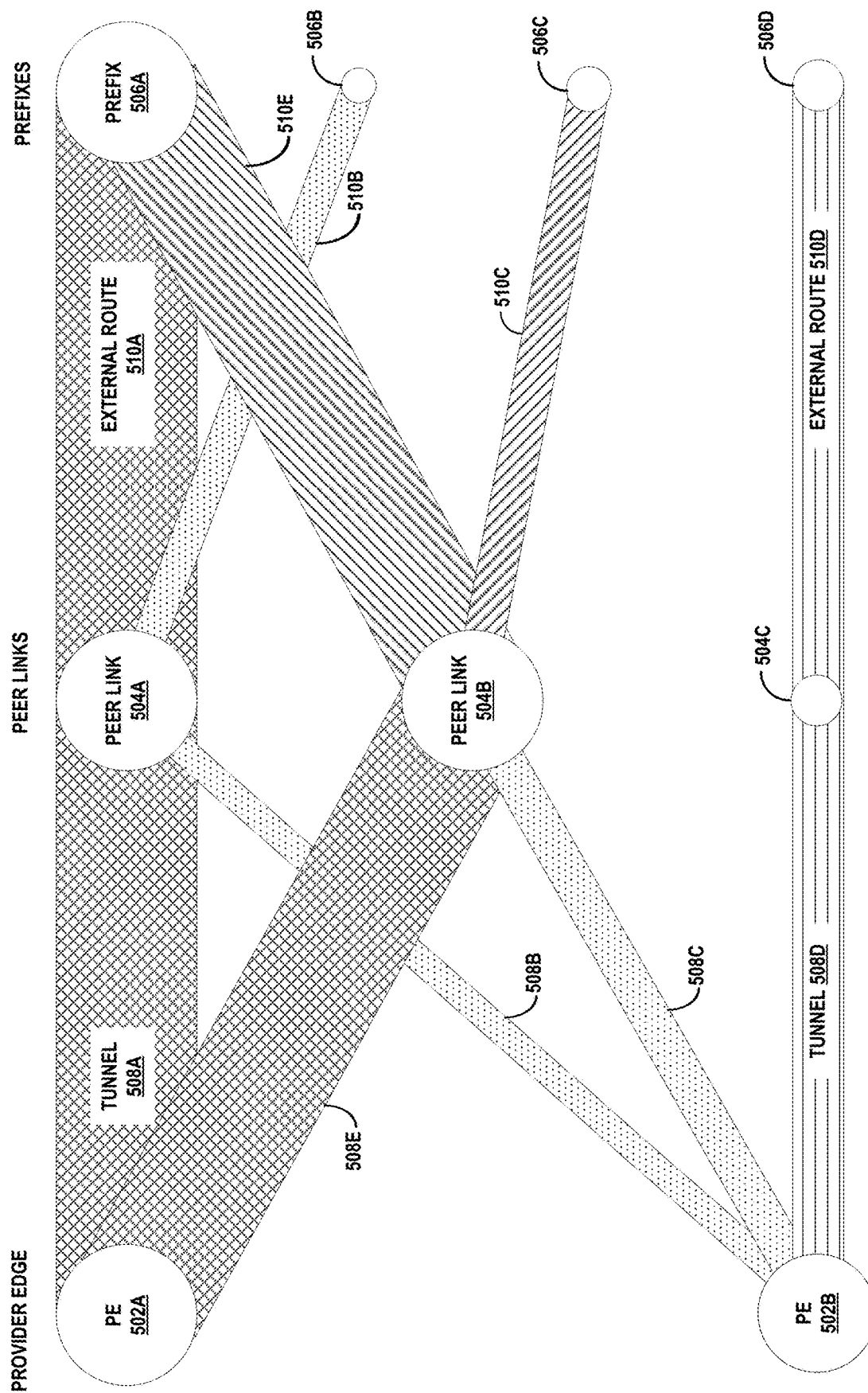
Figure 5D:
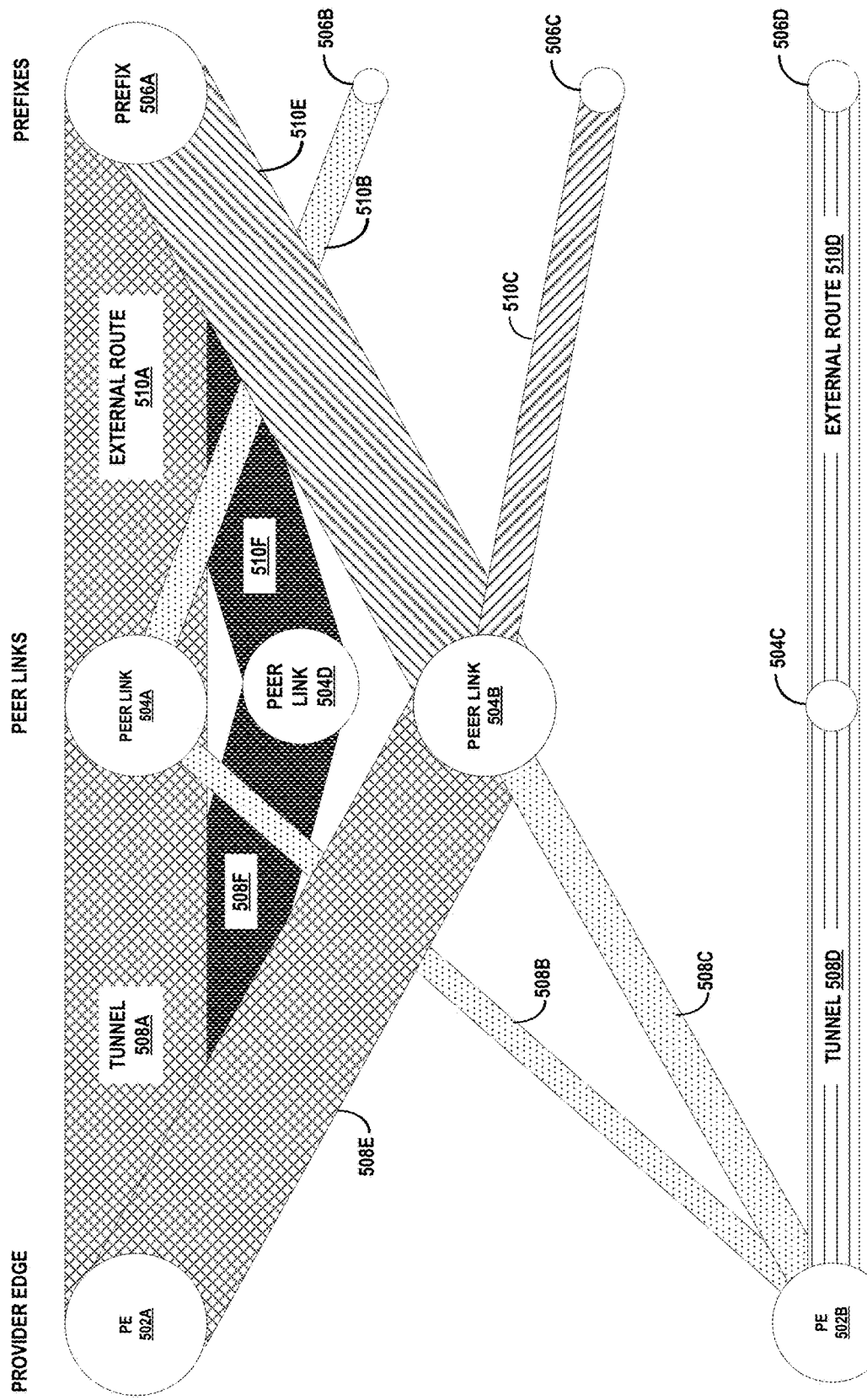
Figure 5E:
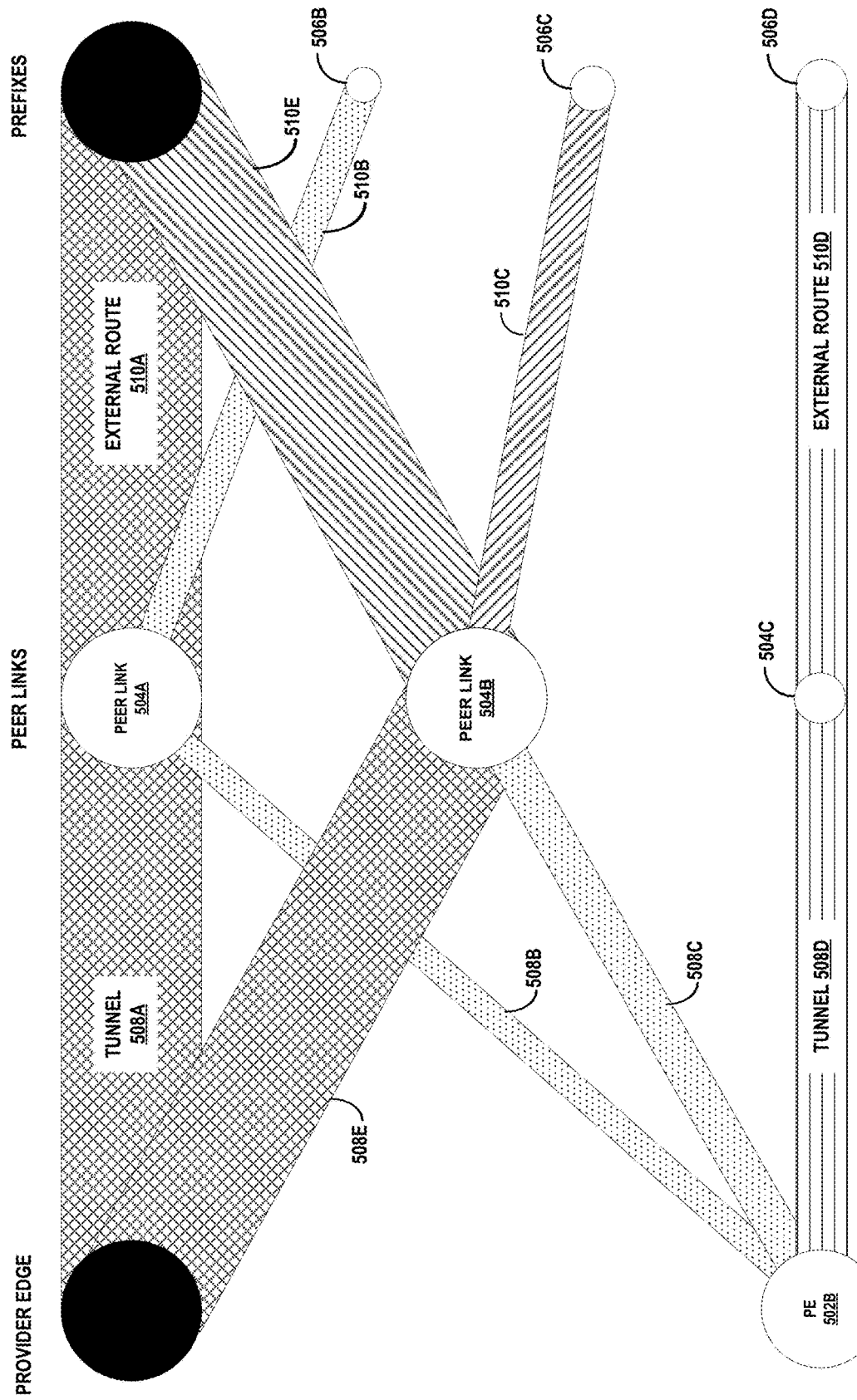
Figure 5F:
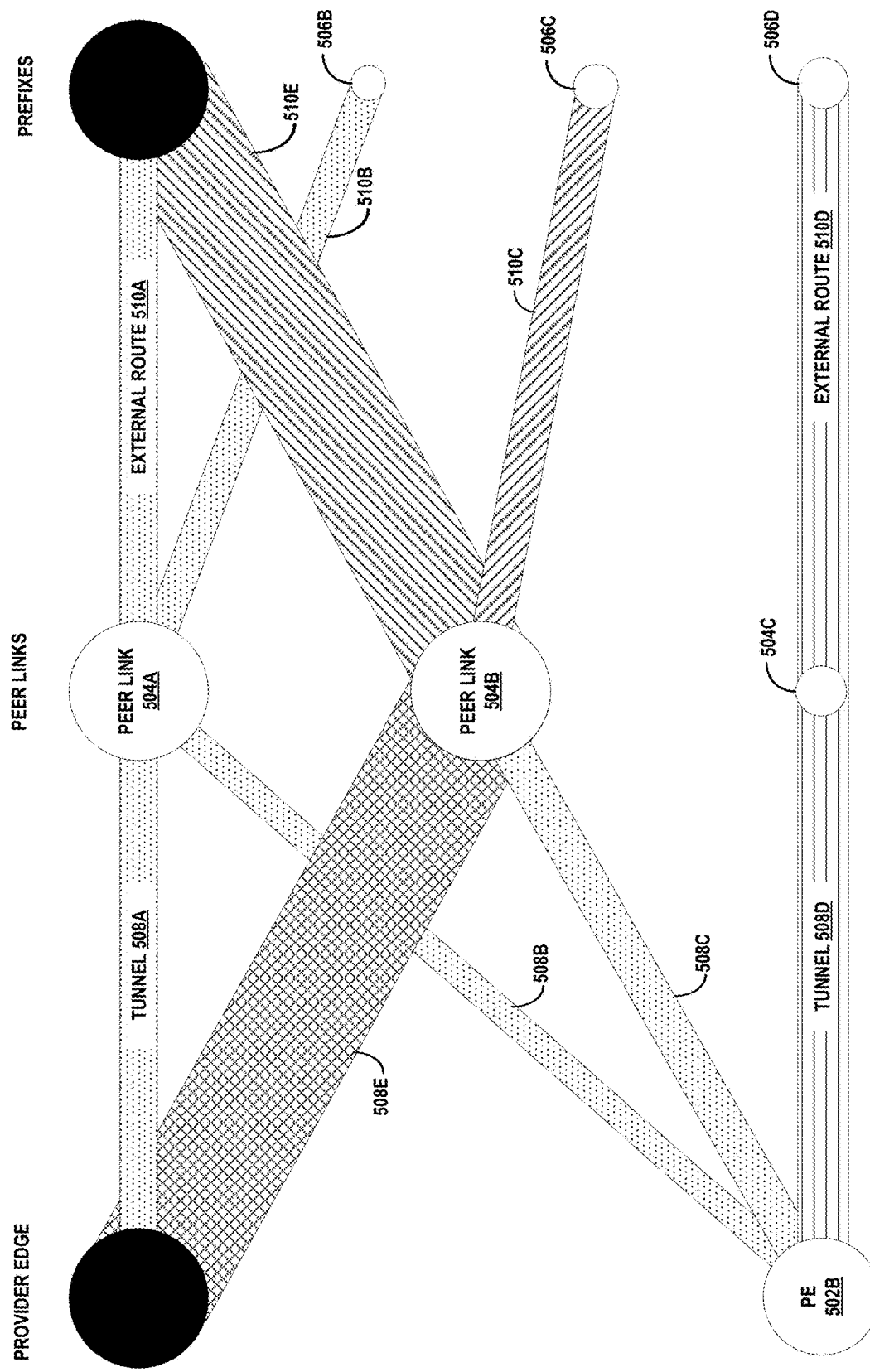

FIGS. 5A-5F show a graphical representation of traffic assignment changes for steps in an example execution plan for an example traffic assignment change. FIG. 5A shows an initial traffic assignment involving PEs 502, peer links 504 and prefixes 506 using tunnels 508 and external routes 510. prior to performing the execution plan and FIG. 5F shows the requested traffic assignment after the execution plan has been performed. In this example, the new traffic assignment changes traffic flows between PE 502A and prefix 506A such that the traffic flows via peer link 504B instead of 504A. In the examples illustrated in FIGS. 5A-5F, the width of a tunnel 508, external route 510, or peer link 504 represents the bandwidth in use or reserved for the tunnel, external route, or peer link. Cross hatching indicates a cost associated with the tunnel 508 or external route 510. Thus, tunnels 508 and external routes 510 having the same width and cross-hatching have the same bandwidth and cost.

FIG. 5A shows a graphical representation of an initial traffic assignment of PEs 502, peer links 504, prefixes 506, and tunnels 508 and external routes 510.

FIG. 5B shows a graphical representation of a change in traffic assignment as part of a first step of the execution plan. In this first step, network controller 104 determines if a tunnel already exists between PE 502A and peer link 504B, and if no tunnel already exists, creates tunnel 508E to peer link 504B.

FIG. 5C shows a graphical representation of a change in traffic assignment as part of a second step of the execution plan. In this second step, network controller 104 increases bandwidth allocated to tunnel 508E (i.e., grows tunnel 508E).

FIG. 5D shows a graphical representation of a third step of the execution plan. In this step, network controller 104 temporarily shifts a portion of network traffic from tunnel 508A to tunnel 508F. This temporary shift can avoid overloading a peer link or other network device.

FIG. 5E shows a graphical representation of a fourth step of the execution plan. In this step, network controller 104 shifts network traffic from tunnel 508F to tunnel 508E.

FIG. 5F shows a graphical representation of a final step of the execution plan. Network controller 104 decreases bandwidth allocated for tunnel 508A (i.e., "shrinks" tunnel 508A). After this step has been performed, the new traffic assignment is complete.

FIGS. 6A-6D illustrate example TACGs and corresponding example graphical representations of traffic assignments during steps of an execution plan that reallocate bandwidth to a peer link having free space. FIGS. 6A-6D illustrates example TACGs have tunnels that terminate at vertices corresponding peer links A-E. Numbers on an edge between peer links A-E represent a change in bandwidth either to or from the peer link. For the purposes of the example, bandwidth will be expressed in units of Gb/s. Further, in this example, a network operator has created a traffic assignment that reallocates 8 Gb/s from peer link A to peer link D. Arrows in the graphical representations 604, 612, 622 and 630 represent a net change in traffic flow and do not necessarily reflect intermediate changes in traffic flows.

Figure 6A:
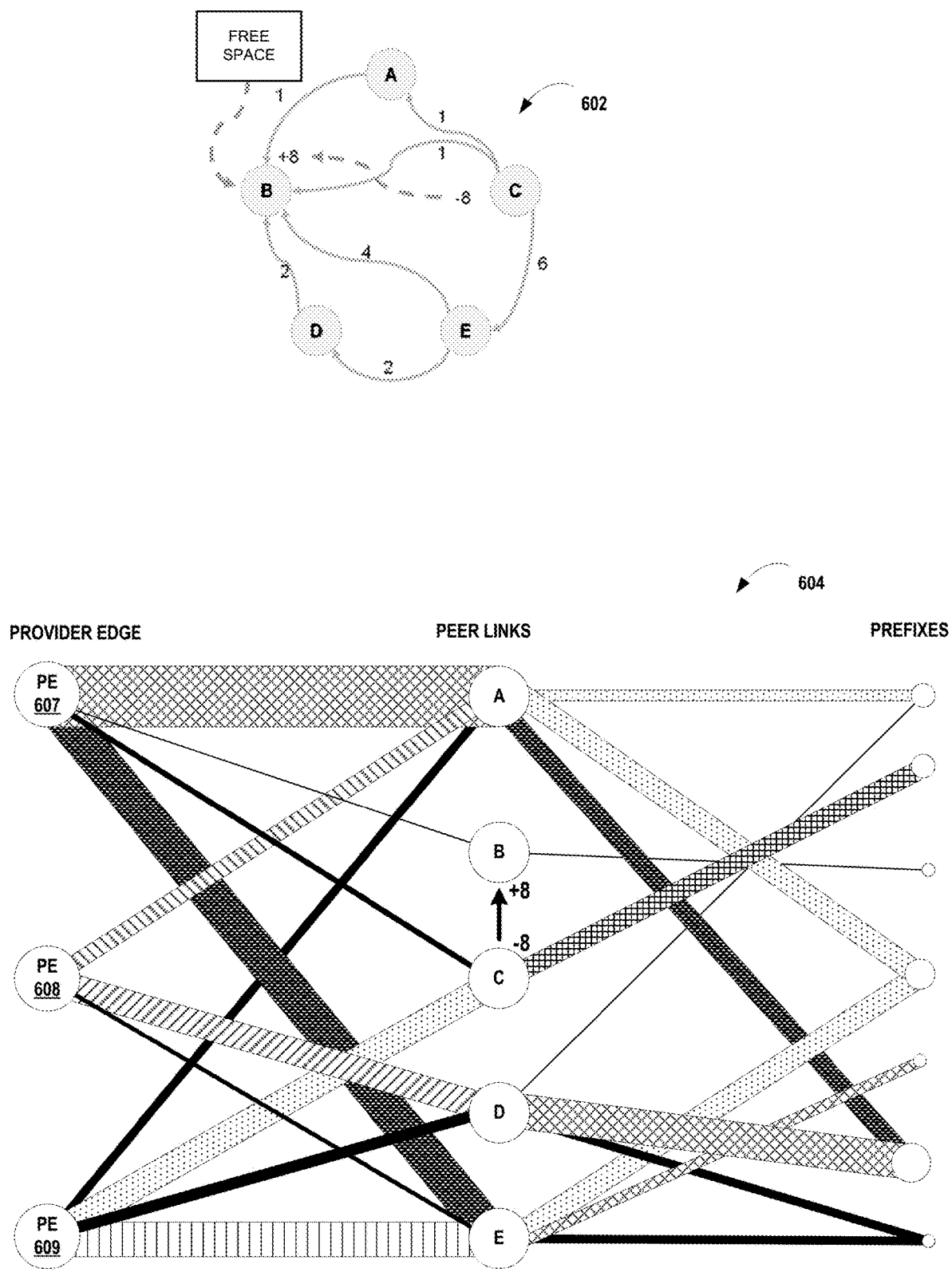
FIGS. 6A-6D illustrate example TACGs and corresponding example graphical representations of traffic assignments during steps of an execution plan, in accordance with at least one example technique described in this disclosure.

In the example illustrated in FIG. 6A, network controller 104 has determined that peer link B has available free bandwidth and generates an execution plan that makes temporary use of the free bandwidth. As a first step in the execution plan, network controller 104 reallocates 8 Gb/s from peer link C to peer link B. However, in order to avoid overloading a peer link, the first step in the execution plan splits the reallocation into smaller reallocations and specifies that network controller 104 reallocate 1 Gb/s from peer link C to peer link A, 1 Gb/s from peer link C to peer link B, and 6 Gb/s from peer link C to peer link E. Other reallocations of bandwidth are shown in TACG 602 that result in a net growth in allocated bandwidth of 8 Gb/s for peer link B (4+2+1+1). In this example, network controller 104 generated an execution plan step that is bandwidth neutral with respect to peer links A, D and E. That is, the total bandwidth reallocated to peer links A, D and E is the same as the total bandwidth reallocated away from the respective peer links. The execution plan step is shown in graphical representation 604 as the final result of the step, i.e., 8 Gb/s of traffic flow between PE 609 to peer link C is to be reallocated from peer link C to peer link B.

Figure 6B:
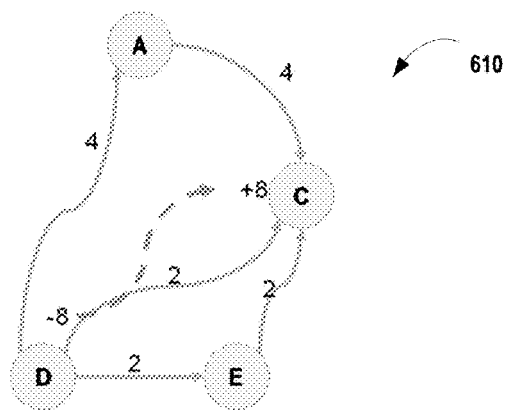
Figure 6B:
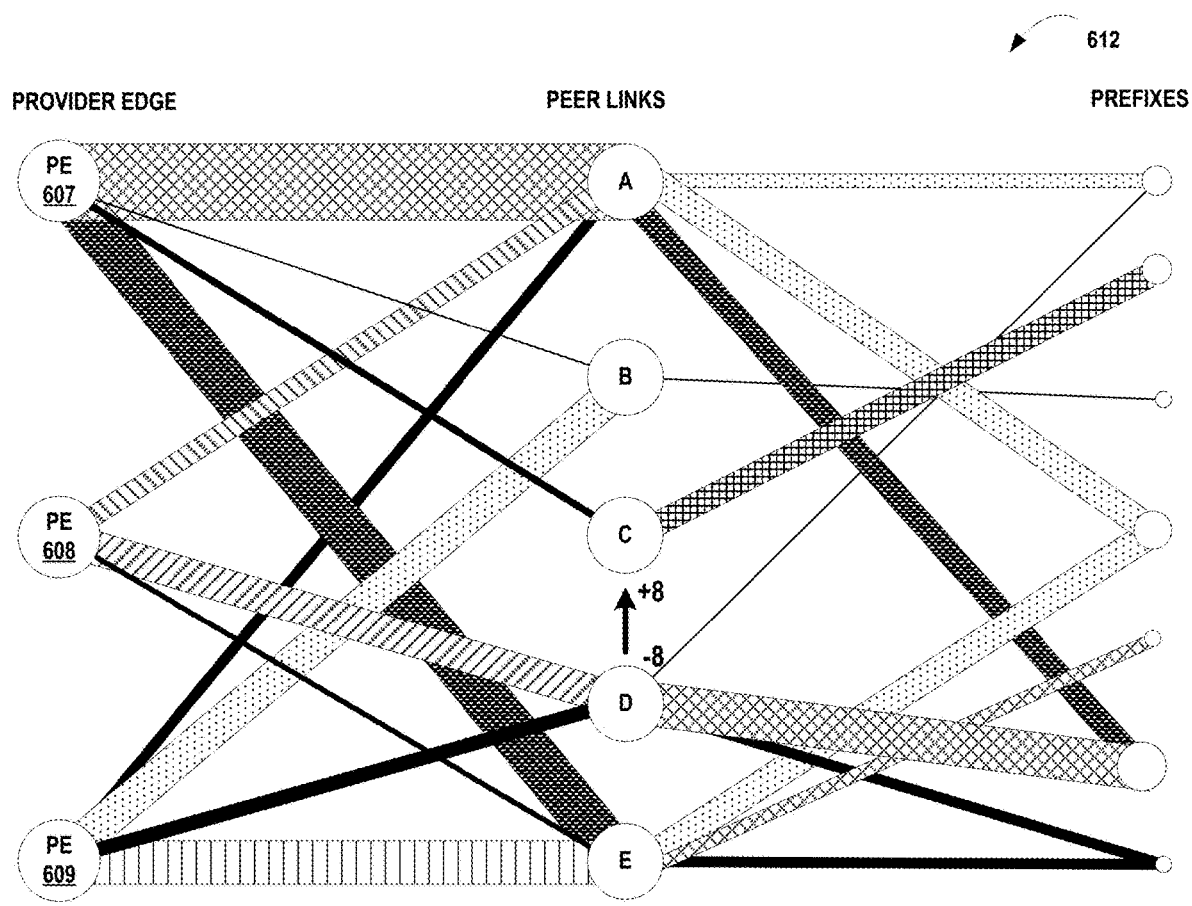

FIG. 6B illustrates a TACG 610 for a second step in the execution plan, and a corresponding graphical representation 612 of the traffic assignment. In the first step of the execution plan shown in FIG. 6A, network controller 104 reallocated 8 Gb/s from peer link C to peer link B. As a result of the reallocation, peer link C now has an available 8 Gb/S. Thus, in this example, network controller 104 has generated a second step of the execution plan in which a net 8 Gb/s is reallocated from peer link D to peer link C. Again, to avoid overloading any one peer link, the reallocations are split between available peer links A, C, D and E. Peer link B is not shown in TACG 610 for the second step because it no longer has available bandwidth after the first step shown in FIG. 6A. Also, network controller 104 has generated the second step of the execution plan to be bandwidth neutral with respect to peer links A and E. Graphical representation 612 shows the net result of the first step, i.e., the termination point of the tunnel between PE 609 and peer link C is moved to peer link B. Additionally, graphical representation 612 shows a net 8 Gb/s is to be reallocated from peer link D to peer link C in this step of the execution plan.

Figure 6C:
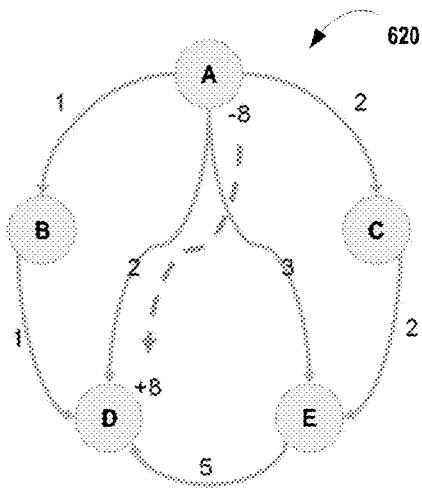
Figure 6C:
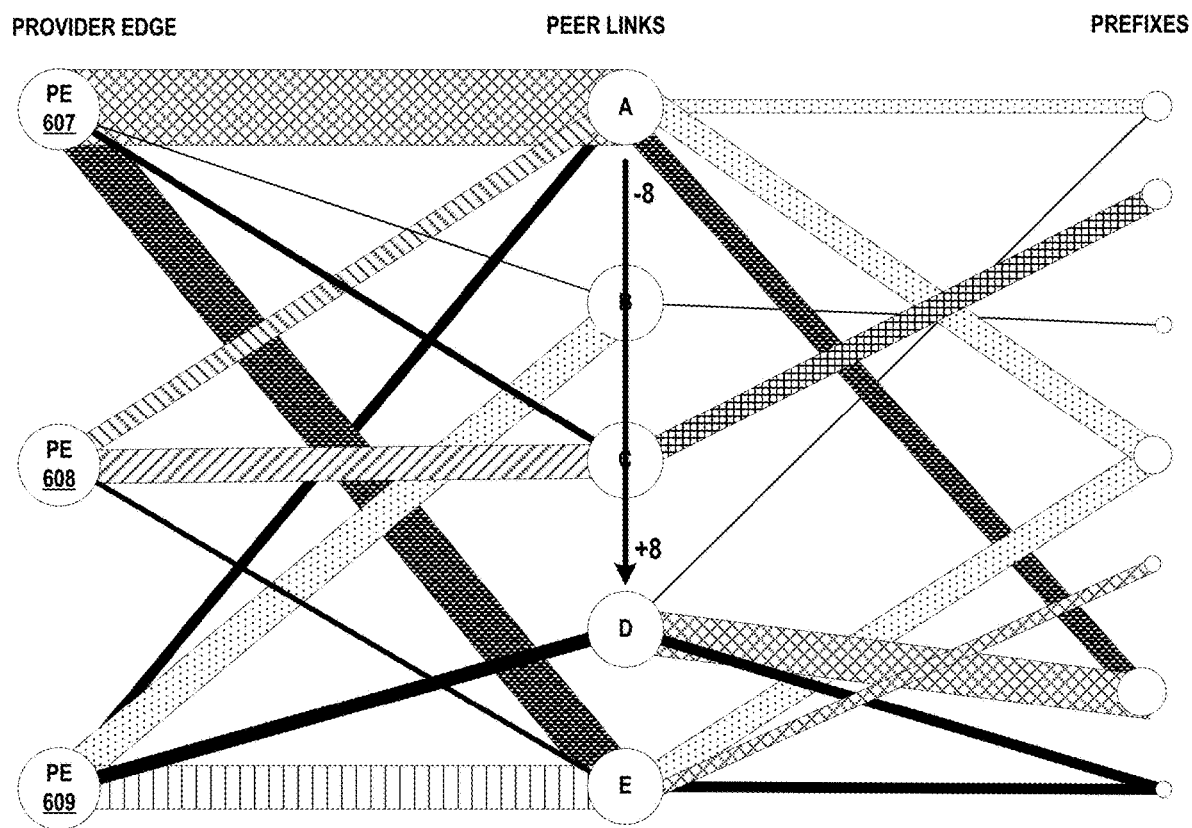

FIG. 6C illustrates a TACG 620 for a third and final step in the execution plan, and a corresponding graphical representation 622 of the traffic assignment. In the second step of the execution plan shown in FIG. 6B, network controller 104 reallocated 8 Gb/s from peer link D to peer link C. As a result of the reallocation, peer link D now has an available 8 Gb/S. Thus, in this example, network controller 104 has generated a third step of the execution plan in which a net 8 Gb/s is reallocated from peer link A to peer link D. Again, to avoid overloading any one peer link, the reallocations are split between available peer links B, C, and E. Also, network controller 104 has generated the third step of the execution plan to be bandwidth neutral with respect to peer links B and C. Graphical representation 612 shows the net result of the second step, i.e., the termination point of the tunnel between PE 608 and peer link D is moved to peer link C. Additionally, graphical representation 612 shows a net 8 Gb/s is to be reallocated from peer link A to peer link D.

Figure 6D:
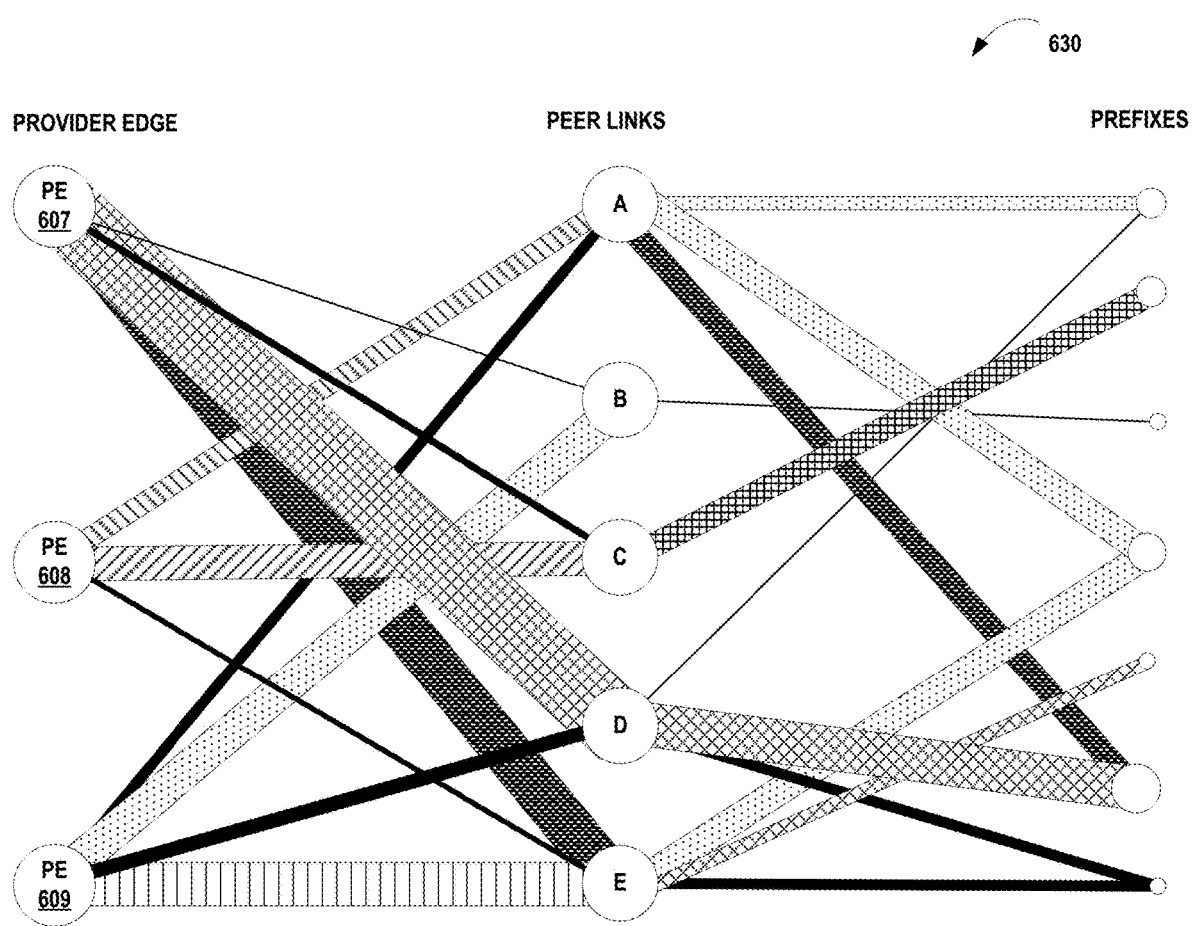

FIG. 6D illustrates a graphical representation of a traffic assignment resulting from the execution plan steps illustrated in FIGS. 6A-6C. Graphical representation 630 shows the net result of the third and final step, i.e., the termination point of the tunnel between PE 607 and peer link A is moved to peer link D.

Figure 7:
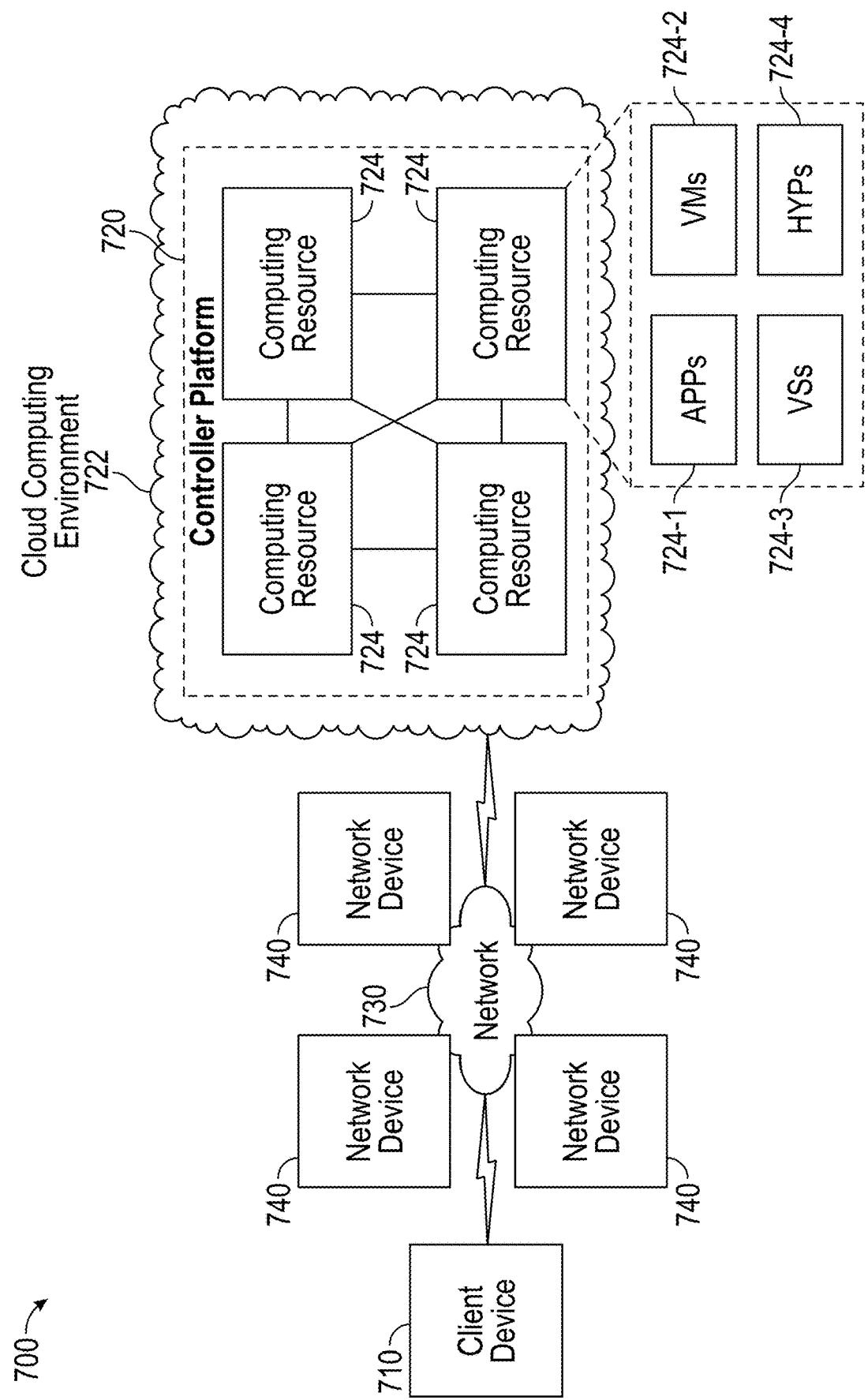
FIG. 7 is a block diagram of an example environment in which some or all of the techniques described herein may be implemented, in accordance with at least one example technique described in this disclosure.

FIG. 7 is a block diagram of an example environment 700 in which some or all of the techniques described herein may be implemented, in accordance with at least one example technique described in this disclosure. As shown in FIG. 7, environment 700 may include a client device 710, a controller platform 720, a network 730, and a group of network devices 740 of network 730. Devices of environment 700 may interconnect via wired connections, wireless connections, or a combination of wired and wireless connections.

Client device 710 includes one or more devices capable of receiving, generating, storing, processing, and/or providing information, such as information described herein. For example, client device 710 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 710 may receive information from and/or transmit information to controller platform 720, via network 730 and network devices 740. In some implementations, client device 710 may receive network traffic from and/or may provide network traffic to other client devices 710 via network 730 (e.g., by routing packets using network devices 740 as intermediaries).

Controller platform 720 includes one or more devices that utilize egress peer engineering to determine optimized traffic plans and to implement an optimized traffic plan. For example, controller platform 720 can be network controller 104 of FIGS. 1A and 1B. In some implementations, controller platform 720 may be designed to be modular such that certain software components may be swapped in or out depending on a particular need. As such, controller platform 720 may be easily and/or quickly reconfigured for different uses. In some implementations, controller platform 720 may receive information from and/or transmit information to one or more client devices 710 and/or network devices 740.

In some implementations, as shown, controller platform 720 may be hosted in a cloud computing environment 722. Notably, while implementations described herein describe controller platform 720 as being hosted in cloud computing environment 722, in some implementations, controller platform 720 may not be cloud-based (i.e., may be implemented outside of a cloud computing environment) or may be partially cloud-based.

Cloud computing environment 722 includes an environment that hosts controller platform 720. Cloud computing environment 722 may provide computation, software, data access, storage, etc., services that do not require end-user knowledge of a physical location and configuration of system(s) and/or device(s) that hosts controller platform 720. As shown, cloud computing environment 722 may include a group of computing resources 724 (referred to collectively as "computing resources 724" and individually as "computing resource 724").

Computing resource 724 includes one or more personal computers, workstation computers, mainframe devices, or other types of computation and/or communication devices.

In some implementations, computing resource 724 may host controller platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, and/or the like.

Application 724-1 includes one or more software applications that may be provided to or accessed by client device 710. Application 724-1 may eliminate a need to install and execute the software applications on client device 710 and/or network devices 740. For example, application 724-1 may include software associated with controller platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a system platform that supports execution of an operating system ("OS"). A process virtual machine may execute a single program and may support a single process. In some implementations, virtual machine 724-2 may execute on behalf of a user (e.g., a user of client device 710 or an operator of controller platform 720), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 740 includes one or more devices capable of receiving, processing, storing, routing, and/or providing traffic (e.g., a packet, other information or metadata, and/or the like) in a manner described herein. For example, network device 740 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 740 may include a gateway, a switch, a firewall, a hub, a bridge, a reverse proxy, a server (e.g., a proxy server, a cloud server, a data center server, etc.), a load balancer, and/or a similar device. In some implementations, network device 740 may be a physical device implemented within a housing, such as a chassis. In some implementations, network device 740 may be a virtual device implemented by one or more computer devices of a cloud computing environment or a data center. In some implementations, a group of network devices 740 may be a group of data center nodes that are used to route traffic flow through network 730.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
receiving, by a computing device having one or more processors, a specification for a change in traffic assignment from a first traffic assignment in a network to a second traffic assignment in the network, the first traffic assignment defining a first path between a first node and a second node, and the second traffic assignment defining a second path between the first node and the second node, the first path different from the second path;
in response to receiving the specification for the change in traffic assignment, determining, by the computing device, a plurality of execution plans for changing the first traffic assignment to the second traffic assignment in the network, each of the execution plans having a plurality of execution steps, wherein the first traffic assignment and the second traffic assignment comprise assignments of network traffic to one or more tunnels, internal routes, or peer links of the network, and wherein the execution steps comprise one or more intermediate traffic assignment changes;
determining, by the computing device, an evaluation metric for each execution plan of the plurality of execution plans, wherein determining the evaluation metric for each execution plan of the plurality of execution plans comprises determining one or more of: an execution efficiency cost based on a sum of costs of traffic assignments after each execution step of the execution steps is performed, a network disruption cost, and a temporary bandwidth cost;
selecting, by the computing device, an execution plan from the plurality of execution plans based on the evaluation metric of the execution plan; and
executing, by the computing device, the execution steps of the selected execution plan to change the first traffic assignment in the network to the second traffic assignment.

2. The method of claim 1, wherein determining the evaluation metric for each execution plan of the plurality of execution plans comprises determining one or more of a progress value, a balance radius value, a balance center value, and an ideal step size quality value.

3. The method of claim 2, wherein determining the progress value comprises determining, for each execution step of the execution plan, a difference in a traffic assignment cost of traffic assignment after the execution step is executed and a traffic assignment cost of the second traffic assignment.

4. The method of claim 2, wherein determining the progress value comprises determining, for each execution step of the execution plan, a progress value $\pi_s$ for the execution step according to the formula:

$$\pi_s = 1 - \frac{c(ta_s) - c(ta')}{c(ta) - c(ta')}$$

where $c(ta_s)$ comprises a cost for the traffic assignment after the execution step is executed, $c(ta)$ comprises a cost for the first traffic assignment and $c(ta')$ comprises a cost for the second traffic assignment.

5. The method of claim 2, wherein determining the balance radius value for an execution plan comprises:
determining a first execution step of the execution plan having a minimum number of traffic assignment changes;
determining a second execution step of the execution plan having a maximum number of traffic assignment changes; and
determining a difference between the maximum number of traffic assignment changes and the minimum number of traffic assignment changes.

6. The method of claim 5, wherein determining the balance center value comprises adding the balance radius value to the minimum number of traffic assignment changes or subtracting the balance radius value from the maximum number of traffic assignment changes.

7. The method of claim 2, wherein determining the ideal step size quality value comprises determining a difference between an ideal step size parameter and an average step size value for the execution plan.

8. The method of claim 1, wherein determining the evaluation metric comprises determining a cost for the first traffic assignment based on a first cost associated with internal routes of the first traffic assignment, a second cost associated with peer links in the first traffic assignment, and a third cost associated with external routes of the first traffic assignment.

9. The method of claim 1, further comprising sorting the plurality of execution steps of the selected execution plan in an order based on decreasing traffic assignment cost changes.

10. The method of claim 1, wherein sum of the costs of the traffic assignments after each execution step is performed comprises a front weighted sum.

11. The method of claim 1, wherein the network disruption cost is based on a total number of tunnel bandwidth changes.

12. The method of claim 1, wherein the temporary bandwidth cost, t, is determined according to the formula:

$$t(ep(ta,ta')) = 2^{32 b_w(ep(ta,ta'))/b_a}$$

where ep(ta, ta') comprises an execution plan changing the first traffic assignment ta to the second traffic assignment ta', $b_w(ep(ta, ta'))$ comprises a worst case temporary bandwidth for the execution plan, and $b_a$ comprises bandwidth available for temporary reservation.

13. The method of claim 1, wherein determining the plurality of execution plans comprises selecting execution plans that do not put traffic that is moving together between tunnels in different execution plan steps.

14. The method of claim 1, wherein the first traffic assignment comprises assignments of traffic associated with the network to one or more tunnels and one or more peer links of the network.

15. An apparatus comprising:
one or more processors; and
a computer-readable medium having instructions stored thereon to cause the one or more processors to:
receive a specification for a change in traffic assignment from a first traffic assignment in a network to a second traffic assignment in the network, the first traffic assignment defining a first path between a first node and a second node, and the second traffic assignment defining a second path between the first node and the second node, the first path different from the second path,
in response to receipt of the specification for the change in traffic assignment, determine a plurality of execution plans for changing the first traffic assignment in the network to the second traffic assignment in the network, each of the execution plans having a plurality of execution steps,
determine an evaluation metric for each execution plan of the plurality of execution plans, wherein determining the evaluation metric for each execution plan of the plurality of execution plans comprises determining one or more of: an execution efficiency cost, a network disruption cost based on a total number of tunnel bandwidth changes, and a temporary bandwidth cost,
select an execution plan from the plurality of execution plans based on the evaluation metric of the execution plan, and
execute the execution steps of the selected execution plan to change the first traffic assignment in the network to the second traffic assignment.

16. The apparatus of claim 15, wherein the instructions to cause the one or more processors to determine the evaluation metric for each execution plan of the plurality of execution plans comprise instructions to cause the one or more processors to determine one or more of a progress value, a balance radius value, a balance center value, and an ideal step size quality value.

17. Non-transitory computer-readable media comprising instructions for causing one or more programmable processors to:
receive a specification for a change in traffic assignment from a first traffic assignment in a network to a second traffic assignment in the network, the first traffic assignment defining a first path between a first node and a second node, and the second traffic assignment defining a second path between the first node and the second node, the first path different from the second path;
in response to receipt of the specification for the change in traffic assignment, determine a plurality of execution plans for changing the first traffic assignment in the network to the second traffic assignment in the network, each of the execution plans having a plurality of execution steps;
determine an evaluation metric for each execution plan of the plurality of execution plans, wherein determining the evaluation metric comprises determining a cost for the first traffic assignment based on a first cost associated with internal routes of the first traffic assignment, a second cost associated with peer links in the first traffic assignment, and a third cost associated with external routes of the first traffic assignment;
select an execution plan from the plurality of execution plans based on the evaluation metric of the execution plan; and
execute the execution steps of the selected execution plan to change the first traffic assignment in the network to the second traffic assignment.

18. The non-transitory computer-readable media of claim 17, wherein the instructions to cause the one or more programmable processors to determine the evaluation metric for each execution plan of the plurality of execution plans comprise instructions to cause the programmable processor to determine one or more of a progress value, a balance radius value, a balance center value, and an ideal step size quality value.

19. The apparatus of claim 16, wherein the instructions to cause the one or more programmable processors to determine the progress value comprises instructions to cause the one or more programmable processors to, for each execution step of the execution plan, a difference in a traffic assignment cost of traffic assignment after the execution step is executed and a traffic assignment cost of the second traffic assignment.

* * * * *